US009363679B2

(12) United States Patent
Giannakis et al.

(10) Patent No.: US 9,363,679 B2
(45) Date of Patent: Jun. 7, 2016

(54) ROBUST PARAMETRIC POWER SPECTRAL DENSITY (PSD) CONSTRUCTION

(71) Applicant: Regents of the University of Minnesota, St. Paul, MN (US)

(72) Inventors: Georgios B. Giannakis, Minnetonka, MN (US); Emiliano Dall'Anese, St. Paul, MN (US); Juan Andrés Bazerque, Minneaplis, MN (US); Hao Zhu, St. Paul, MN (US); Gonzalo Mateos, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 130 days.

(21) Appl. No.: 13/920,767

(22) Filed: Jun. 18, 2013

(65) Prior Publication Data

US 2014/0211644 A1    Jul. 31, 2014

Related U.S. Application Data

(60) Provisional application No. 61/661,109, filed on Jun. 18, 2012.

(51) Int. Cl.
*H04W 16/14* (2009.01)
*H04W 24/10* (2009.01)

(52) U.S. Cl.
CPC .............. *H04W 16/14* (2013.01); *H04W 24/10* (2013.01)

(58) Field of Classification Search
None
See application file for complete search history.

(56) References Cited

U.S. PATENT DOCUMENTS

| 8,150,344 | B1 | 4/2012 | Goyal et al. |
| 2003/0050098 | A1 | 3/2003 | D'Agati et al. |
| 2008/0004028 | A1 | 1/2008 | Vincent |
| 2010/0091745 | A1 | 4/2010 | Bevan et al. |
| 2011/0130135 | A1 | 6/2011 | Trigui |
| 2013/0176872 | A1 | 7/2013 | Stanczak et al. |

OTHER PUBLICATIONS

Dall'Anese et al., "Group sparse Lasso for cognitive network sensing robust to model uncertainties and outliers," http://spincom.umn.edu/files/pdfs/phycom2011nov.pdf; Physical Communication (2001), doi:10.1016/j.phycom.2011.07.005, Nov. 2011, pp. 1-12.*
"IEEE Standard for Information Technology—Telecommunications and Information Exchange Between Systems—Local and Metropolitan Area Networks—Specific Requirements; Part II: Wireless LAN Medium Access Control (MAC) and Physical Layer (PHY) Specifications; Amendment 6 Wireless Access in Vehicular Environments," IEEE Standard 802.11, IEEE Computer Society, Jun. 12, 2007, 51 pp.
Agrawal et al., "Correlated link shadow fading in multihop wireless networks," IEEE Trans. Wireless Communication, vol. 8(8), Aug. 2009 pp. 4024-4036.
Aharon et al., "K-SVD: An Algorithm for Designing Overcomplete Dictionaries for Sparse Representation," IEEE Transactions on Signal Processing, vol. 54(11), Nov. 2006, pp. 4311-4322.

(Continued)

*Primary Examiner* — Jae Y Lee
*Assistant Examiner* — Alan Lindenbaum
(74) *Attorney, Agent, or Firm* — Shumaker & Sieffert, P.A.

(57) ABSTRACT

This disclosure describes techniques for constructing power spectral density (PSD) maps representative of the distribution of radio frequency (RF) power as a function of both frequency and space (geographic location). For example, the disclosure describes techniques for construction PSD maps using robust basis pursuit forms of signal expansion.

24 Claims, 16 Drawing Sheets

(56) References Cited

OTHER PUBLICATIONS

Alay-Feki et al., "Informed Spectrum Usage in Cognitive Radio Networks: Interference Cartography," In Proc. of the PIMRC Conf., 1-5, Cannes, France, Sep. 2008, 5 pp.
Angelosante et al., "Group Lassoing change-points in Piecewise-Stationary AR Signals," presented in the 17th Int. conf. DSP. Corfu Island, Greece, Jul. 2011, 8 pp.
Angelosante et al., "Online Adaptive Estimation of Sparse Signals: Where RLS Meets the 1_1-norm," IEEE Trans. Signal Process., vol. 58(7), Jul. 2010, pp. 3436-3447.
Bakin, "Adaptive Regression and Model Selection in Data Mining Problems," Ph.D. Dissertation, Australian national Univ., Canberra, May 1999, 168 pp.
Bazerque et al., "Distributed Spectrum Sensing for Cognitive Radio Networks by Exploiting Sparsity," IEEE Trans. Signal Process., vol. 58(3), Mar. 2010, pp. 1847-1862.
Bazerque et al., "Group-Lasso on Splines for Spectrum Cartography," IEEE Trans. Signal Process., vol. 59(10), Oct. 2011, pp. 4648-4663.
Beck et al., "A fast Iterative Shrinkage-Thresholding Algorithm for Linear Inverse Problems," SIAM J. Imag. Sci., vol. 2(1), Jan. 2009, pp. 183-202.
Bertsekas et al., "Partial Solutions Manual Parallel and Distributed Computation: Numerical Methods," Massachusetts Institute of Technology, Athena Scientific of Baltimore, MA, 1989, 8 pp. (Note: Applicant points out in accordance with MPEP 609.04(a) that the 1989 year of publication is sufficiently earlier than the effective U.S. filing date and any foreign priority date of May 21, 2013 so that the particular month of publication is not in issue.).
Bertsekas, "Nonlinear Programming," 2nd Ed. Athena Scientific, 1999, 3 pp. (Note: Applicant points out in accordance with MPEP 609.04(a) that the 1999 year of publication is sufficiently earlier than the effective U.S. filing date and any foreign priority date of May 21, 2013 so that the particular month of publication is not in issue.).
Boyd et al., "Convex Optimization," Stanford University, Cambridge University Press, Mar. 2004, 730 pp.
Breiman, "Better subset regression using the nonnegative garrote," Technometrics, vol. 37(4), Nov. 1995, pp. 373-384.
Candes et al., "Enhancing Sparsity by Reweighted l1 Minimization," J. Fourier Anal. Appl., vol. 14(5), Oct. 2008, pp. 877-905.
Chen et al., "Atomic Decomposition by Basis Pursuit," SIAM Review, vol. 43(1), Feb. 2001, pp. 129-159.
Chui et al., "A New Algorithm for Non-rigid Point Matching," in Proc. Conf. Comput. Vis. Pattern Recongnit., Hilton Head, SC, Jun. 2000, pp. 44-51.
Dall'Anese et al., "Channel Gain Map Tracking Via Distributed Kriging," IEEE Trans Veh. Technol., vol. 60(3), Mar. 2011, pp. 1205-1211.
Dall'Anese et al., "Power Allocation for Cognitive Radio Networks Under Channel Uncertainty," in Proc. of the Intl. Conf. on Communications, Kyoto, Japan, Jun. 2011, 6 pp.
Duchon, "Splines Minimizing Rotation-Invariant Semi-norms in Sobolev Spaces," New York: Springer-Verlag, 1977, 16 pp. (Note: Applicant points out in accordance with MPEP 609.04(a) that the 1977 year of publication is sufficiently earlier than the effective U.S. filing date and any foreign priority date of May 21, 2013 so that the particular month of publication is not in issue.).
Efron et al., "Least Angle Regression," Statistics Department, Stanford University, Jan. 9, 2003, 44 pp.
Elad et al, "Image Denoising Via Sparse and Redundant Representations Over Learned Dictionaires," IEEE Trans. Image Proc., vol. 15(12), Dec. 2006, pp. 3736-3745.
Friedman et al., "A Note on the Group Lasso and a Sparse Group Lasso," preprint, downloadable from http:www-stat.stanford.edu/~tibs, Feb. 11, 2010, 8 pp.
Fuchs, "A New Aproach to Robust Linear Regression," In Proc. of 14th IFAC World Congress, Beijing, 1999, 6 pp. (Note: Applicant points out in accordance with MPEP 609.04(a) that the 1999 year of publication is sufficiently earlier than the effective U.S. filing date and any foreign priority date of May 21, 2013 so that the particular month of publication is not in issue.).
Ganesan et al., "Spatiotemporal Sensing in Cognitive Radio Networks," IEEE Journal Sel. Areas Commun., vol. 26(1), Jan. 2008, pp. 5-12.
Goldsmith, "Wireless Communications," Cambridge, U.D., Campbridge Univ. Press, 2006, 7 pp. (Note: Applicant points out in accordance with MPEP 609.04(a) that the 2006 year of publication is sufficiently earlier than the effective U.S. filing date and any foreign priority date of May 21, 2013 so that the particular month of publication is not in issue.).
Goldstein et al., "The Split Bregman Method for L1 Regularized Problems," SIAM J. Imag. Sci,. vol. 2, Apr. 2009, pp. 323-343.
Hastie et al., "Generalized Additive Models," London, U.K., Chapman & Hall, 1990, 5 pp. (Note: Applicant points out in accordance with MPEP 609.04(a) that the 1990 year of publication is sufficiently earlier than the effective U.S. filing date and any foreign priority date of May 21, 2013 so that the particular month of publication is not in issue.).
Hastie et al., "The Elements of Statistical Learning: Data Mining, Inference, and Prediction," 2nd ed., New York, Springer, 2009, 11 pp. (Note: Applicant points out in accordance with MPEP 609.04(a) that the 2009 year of publication is sufficiently earlier than the effective U.S. filing date and any foreign priority date of May 21, 2013 so that the particular month of publication is not in issue.).
Herman et al., "General Deviants: An Analysis of Perturbations in Compressed Sensing," IEEE Journal of Selected Topics in Signal Processing, vol. 4(2), Apr. 2010, 8pp.
Hong et al., "Secondary Spectrum Access Networks: Recent Developments on the Spatial Models," IEEE Veh. Technol. Magazine, vol. 4(2), Jun. 2009, pp. 36-43.
Huber et al., "Robust Statistics," Wiley, New York, 2006, 9 pp. (Note: Applicant points out in accordance with MPEP 609.04(a) that the 2006 year of publication is sufficiently earlier than the effective U.S. filing date and any foreign priority date of May 21, 2013 so that the particular month of publication is not in issue.).
Kim et al., "Cooperative Spectrum Sensing for Cognitive Radios Using Kriged Kalman Filtering," IEEE J. Sel. Topics Sig. Proc., vol. 5(1), Feb. 2011, pp. 24-36.
Kim et al., "Sequential and Cooperative Sensing for Multichannel Cognitive Radios," IEEE Trans. Signal Process., vol. 58(8), Aug. 2010, pp. 4239-4253.
King et al., "Crawdad Data Set," Mannheim/Compass (v. Apr. 11, 2008) [online]. Available: http:/crawdad.cs.dartmouth.edu/mannheim/compass, Apr. 2008, 2 pp.
Lee et al., "Efficient Sparse Coding Algorithms," Advances in Neural Information Processing Systems 19, B. Scholkopf, J. Platt, and T. Hoffman, Eds. Cambridge, MA, MIT Press, retrieved from online http://www.cs.stanford.edu/people/ang//papers/nips06-sparsecoding.pdf, Jan. 2007, pp. 801-808.
Lin et al., "Component Selection and Smoothing in Multivariate Nonparametric Regression," Ann. Stat., vol. 34(5), May 2006, 30 pp.
Liu et al, "Multi-Task Feature Learning via Efficient /2.1-norm Minimization," presented at the 25th conf. Uncertainty Artificial Intelligence, Montreal, QC, Canada, Jun. 2009, 10 pp.
Ma et al., "Soft Combination and Detection for Cooperative Spectrum Sensing in Cognitive Radio Networks," IEEE Trans. Wireless Commun., vol. 7(11), Nov. 2007, 5 pp.
Mairal et al, "Online Learning for Matrix Factorization and Sparse Coding," J. Machine Learning Res., vol. 11, Mar. 2010, pp. 19-60.
Mark et al., "Estimation of Maximum Interference-Free Power Level for Opportunistic Spectrum Access," IEEE Trans. Wireless Commun., vol. 8(5), May 2009, pp. 2505-2513.
Mateos et al., "Distributed Sparse Linear Regression," IEEE Trans. Sig. Proc., vol. 58(10), Oct. 2010, pp. 5262-5276.
Mateos et al., "Spline-based spectrum cartography for cognitive radios," in Proc. 43rd Asilomar conf. Signals, Syst., Comput., Nov. 2009, pp. 1025-1029.
Matheron, "The Intrinsic Random Functions and their Application," Advances in Applied Probability, vol. 5, Dec. 1973, pp. 439-468.
Meier et al., "The group Lasso for logistic regression," J. Roy. Stat. Soc. B, vol. 70(1), Feb. 2008, pp. 53-71.

(56) References Cited

OTHER PUBLICATIONS

Micchelli et al., "On learning vector-valued functions," Neural comput., vol. 17(1), Jan. 2005, pp. 177-204.
Minka, "Old and new matrix algebra useful for statistics," retrieved from http://research.microsoft.com/en-us/um/people/minka/papers/matrix/, Dec. 2000, 19 pp.
Mishra et al., "Cooperative sensing among cognitive radios," in Proc. 42nd Int. Conf. commun., Istanbul, Turkey, Jun. 2006, 7 pp.
Nesterov, "Gradient Methods for Minimizing Composite Objective Function," Center for Operations Research and Econometrics (CORE), Sep. 2007, 32 pp.
Nishimori et al., "Spatial Opportunity for Cognitive Radio Systems with Heterogeneous Path Loss Conditions," IEEE, in Proc. 65th Vehicular Technology Conference, Apr. 2007, pp. 2631-2635.
Oestges et al., "Experimental Characterization and Modeling of Outdoor-to-Indoor and Indoor-to-Indoor Distributed Channels," IEEE Trans. Veh. Technol., vol. 59(5), Jun. 2010, pp. 2253-2265.
Olshausen et al., "Sparse Coding with an Covercomplete Basis Set: A Strategy Employed by V1?" Vision Research, vol. 37(23), Dec. 1997, pp. 3311-3325.
Pauca et al., "Nonnegative Matrix Factorization for Spectral Data Analysis," Linear Algebra and its Appl., vol. 416(1), Jul. 2006, 26 pp.
Perrin et al., "Scalp Current Density Mapping: Value and Estimation from Potential Data," IEEE Trans. Biomed. Eng., vol. 34(4), Apr. 1987, pp. 283-288.
Puig et al., "A multidimensional shrinkage-thresholding operator," IEEE, 15th workshop on statistical signal processing, Sep. 2009, pp. 113-116.
Quan et al., "Collaborative Wideband Sensing for Cognitive Radios," IEEE Signal Process. Mag., vol. 25(6), Nov. 2008, pp. 60-73.
Raina et al, "Self-Taught Learning: Transfer Learning from Unlabeled Data," Proc. of the 24th Intl. Conf. on machine Learning, Corvallis, OR, Jun. 2007, pp. 759-766.
Rappaport, "Wireless Communications: Principles & Practice," Prentice Hall, 1996, 9 pp. (Note: Applicant points out in accordance with MPEP 609.04(a) that the 1996 year of publication is sufficiently earlier than the effective U.S. filing date and any foreign priority date of May 21, 2013 so that the particular month of publication is not in issue.).
Ravikumar et al., "Sparse additive models," J. Roy. Stat. Soc. B., vol. 71(5), Feb. 2009, pp. 1009-1030.
Ruszczynski, "Nonlinear Optimization," Princeton Univ. Press, Princeton, NJ, Jan. 22, 2006, 463 pp.
Schizas et al., "Consensus in Ad Hoc WSNs with Noisy Links—Part 1: Distributed Estimation of Deterministic Signals," IEEE Trans. Sig. Proc., vol. 56(1), Jan. 2008, pp. 350-364.
Sprechmann et al., "C-HiLasso: A Collaborative Hierarchical Sparse Modeling Framework," IEEE Transactions on Signal Processing, vol. 59(9), Sep. 2011, pp. 4183-4198.
Stein, "Interpolation of Spatial Data: Some Theory for Kriging," Springer Series in Statistics, Springer, New York, 1999, 15 pp. (Note: Applicant points out in accordance with MPEP 609.04(a) that the 1999 year of publication is sufficiently earlier than the effective U.S. filing date and any foreign priority date of May 21, 2013 so that the particular month of publication is not in issue.).
Tibshirani, "Regression Shrinkage and Selection via the Lasso: A Retrospective," J. Royal Stat. Soc., series B, vol. 73(3), Apr. 2011, 273-282.
Tseng et al, "A Coordinate Gradient Descent Method for Nonsmooth Separable Minimization," Mathematical Programming B, vol. 117(1-2), Mar. 2009, pp. 387-423.
Tseng, "Convergence of Block Coordinate Descent Method for Nondifferentiable Maximization," J. Opt. Theory Appl., vol. 109(3), Jun. 2001, 20 pp.
Unnikrishnan et al., "Cooperative Sensing for Primary Detection in Cognitive Radio," IEEE J. Sel. Topics Sig. Proc., vol. 2(1), Feb. 2008, pp. 18-27.
Unser, "Splines: A Perfect Fit for Signal and Image Processing," IEEE Signal Process Mag., vol. 16(6), Nov. 1999, pp. 22-38.
Van Huffel et al., "The Total Least-Squares Problem: Computational Aspects and Analysis," Frontiers in Applied Mathematics, SIAM, Philadelphia, 1991, 10 pp. (Note: Applicant points out in accordance with MPEP 609.04(a) that the 1991 year of publication is sufficiently earlier than the effective U.S. filing date and any foreign priority date of May 21, 2013 so that the particular month of publication is not in issue.).
Wahba et al., "Some New Mathematical Methods for Variational Objective Analysis Using Splines and Cross Validation," Month, Weather Rev., vol. 108, Apr. 1980, pp. 1122-1145.
Wahba, "Spline Models for Observational Data," CBMS-NSF Regional Conference Series in Applied Mathematics, SIAM, vol. 59, Philadelphia, PA, 1990, 13 pp. (Note: Applicant points out in accordance with MPEP 609.04(a) that the 1990 year of publication is sufficiently earlier than the effective U.S. filing date and any foreign priority date of May 21, 2013 so that the particular month of publication is not in issue.).
Wright et al., "Sparse Reconstruction by Separable Approximation," IEEE Trans. Signal Process, vol. 57(7), Jul. 2009, pp. 2479-2493.
Yuan et al., "Model Selection and Estimation in Regression with Grouped Variables," Journal of the Royal Statistical Society, vol. 68(1), Feb. 2006, pp. 49-67.
Zhang et al., "Outlier Detection Techniques for Wireless Sensor Networks: A Survey," IEEE Commun. Surveys Tuts., vol. 12(2), second quarter 2010, pp. 159-170 (Note: Applicant points out in accordance with MPEP 609.04(a) that the 2010 year of publication is sufficiently earlier than the effective U.S. filing date and any foreign priority date of May 21, 2013 so that the particular month of publication is not in issue.).
Zhao et al., "A Survey of Dynamic Spectrum Access: Signal Processing and Networking Perspectives," IEEE Signal Process Magazine, vol. 24(3), May 2007, 4 pp.
Zhu et al., "Sparsity-Cognizant Total Least-Squares for Perturbed Compressive Sampling," IEEE Trans. Sig. Proc., 59(5), May 2011, 15 pp.
Zou et al., "One-Step Sparse Estimates in Nonconcave Penalized Likelihood Models," The Annals of Statistics, vol. 36(4), Aug. 2008, pp. 1509-1533.
Zou, "The Adaptive Lasso and its Oracle Properties," J. Amer. Stat. Assoc., vol. 101(476), Dec. 2006, pp. 1418-1429.

* cited by examiner

ROBUST PARAMETRIC POWER SPECTRAL DENSITY (PSD) CONSTRUCTION

This application claims the benefit of U.S. Provisional Application No. 61/661,109, filed Jun. 18, 2012, the entire contents of which are incorporated herein by reference.

STATEMENT REGARDING FEDERALLY SPONSORED RESEARCH OR DEVELOPMENT

This invention was made with government support under ECCS-1002180 awarded by the National Science Foundation. The government has certain rights in the invention.

TECHNICAL FIELD

The invention relates to wireless communication and, more specifically, to spectrum cartography.

BACKGROUND

All wireless transmissions use a portion of the radio frequency spectrum. Cellular phones, broadcast television, satellite, and short-distance wireless networks such as Bluetooth and wireless local area networks (WLAN) utilize different portions of the Wi-Fi, for example, typically use wireless frequency spectrum. Often it is important to coordinate the use of the various technologies and frequency ranges to ensure that the technologies do not interfere with each other or with planned future services.

SUMMARY

This disclosure describes techniques for constructing power spectral density (PSD) maps representative of the distribution of radio frequency (RF) power as a function of both frequency and space (geographic location). For example, the disclosure describes techniques for construction PSD maps using robust basis pursuit form of signal expansion.

To further address the challenges encountered with this multi-dimensional sensing vision, the present paper presents a collaborative sensing scheme whereby CRs cooperate to localize the actively transmitting primary users (Pus) and estimate their PSD across space in the presence of model uncertainties.

One example of the techniques described herein is a novel sensing scheme based on a parsimonious system model accounting for the scarce presence of active PUs in the same frequency band(s), in the monitored area, due to mutual interference. Using a virtual grid-based approach for the potential PU transmitter locations, a form of spatial-domain sparsity emerges because actual PU transmitters are present in only few of the potential (grid) locations. A basis expansion model is then adopted to approximate the PU transmit-PSD distribution in frequency, which renders the sensing objective tantamount to estimating the PSD basis coefficients corresponding to each grid point. Since individual PU transmissions are narrow-band relative to the large swath of frequencies a CR can sense, only few of the PSD basis coefficients are non-zero—a fact giving rise to frequency-domain sparsity.

This parsimonious system model thus entails a form of hierarchical dual-domain sparsity in the PSD basis coefficients that are to be estimated, in the sense that groups of coefficients corresponding to locations with no PUs will be collectively zero. In addition, some of the basis coefficients within groups corresponding to active PU locations will be zero. Capitalizing on this form of hierarchical sparsity, a group sparse regression problem is formulated, which is to be solved centrally by either a fusion center (FC), or, individual CRs using their measured PSDs. A novel low-complexity algorithm for solving such a problem is developed using the alternating direction method of multipliers (ADMoM).

One challenge addressed by the techniques is acquiring the grid-to-CR channel gains present in the underlying regression matrix. One way to acquire such information is through the channel gain cartography approach. However, possible inaccurate channel gains or adoption of a shadowing-agnostic path loss-only model could deteriorate the performance of the sensing algorithm. Also, a grid-based approach introduces itself possible model offsets, as the actual PU locations may not coincide with points of the grid. To account for these uncertainties, a robust version of the group sparse (GS) least-absolute-shrinkage-and-selection operator (Lasso) is described herein. One technique described herein is an extension of the sparse total least-squares (TLS) framework to incorporate the hierarchical sparsity inherent to this sensing application. Combining the merits of Lasso, group Lasso, and TLS, the proposed group sparse (GS-)TLS approach described herein yields hierarchically-sparse PSD estimates that are also robust to model uncertainties induced by the random channel, grid offsets, and basis approximation errors. In spite of the non-convexity of the proposed GS-TLS criterion, an iterative solver with guaranteed convergence to at least a locally-optimal solution is described.

Additional factors that may compromise accuracy of PSD estimates at the CRs, are abrupt changes in shadow fading that may be due to, e.g., moving obstacles or moving CRs, and, possible failures of the sensing modules themselves. A robust GS-TLS formulation is proposed here, that is capable of discerning and removing such so-called model outliers, which in turn leads to reliable PSD estimates. However, sorting out unreliable measurements not only promotes estimation accuracy, but also leads to self-healing and re-organization mechanisms for the CRs network.

This disclosure introduces the basis expansion model, and describes the PSD observations used for the model fitting approach. A centralized algorithm for solving GS-Lasso problems is described, whereas perturbations in the channel (regression) matrices are considered. An outlier-resilient sensing algorithm is devised, numerical results are provided.

In one example, a method comprises sensing local radio-frequency (RF) interference spectrum at each of a plurality of sensors positioned at a plurality of locations within a geographic region, and computing a basis expansion model from the sensed RF interference spectrum at each of the sensors to construct a power spectral density (PSD) map representative of the distribution of RF power throughout the geographic region as a function of frequency and location. The basis expansion model is computed as a plurality of functions having a corresponding coefficient, each of the functions representing a power emitted by an RF-enabled device on a corresponding frequency band. Moreover, the coefficients are computed of the basis expansion model using a group sparse least-absolute-shrinkage-and-selection operator (GS-Lasso).

In another example, a system comprises a plurality of sensors to sense a local radio-frequency (RF) interference spectrum at each of a plurality of locations within a geographic region. A processor computes a basis expansion model from the sensed RF interference spectrum at each of the sensors to construct a power spectral density (PSD) map representative of the distribution of RF power throughout the geographic region as a function of frequency and location. The processor computes the basis expansion model is computed as a plurality of functions having a corresponding coefficient, each of the functions representing a power emitted by an RF-enabled device on a corresponding frequency band. The processor computing the coefficients of the basis expansion model using a group sparse least-absolute-shrinkage-and-selection operator (GS-Lasso).

In another example, a mobile device comprises a sensor to sense a local radio-frequency (RF) interference spectrum at locations within a geographic region. The mobile device further comprises a processor that computes a basis expansion model from the sensed RF interference spectrum at each of the sensors to construct a power spectral density (PSD) map representative of the distribution of RF power throughout the geographic region as a function of frequency and location. The processor computes the basis expansion model is computed as a plurality of functions having a corresponding coefficient, each of the functions representing a power emitted by an RF-enabled device on a corresponding frequency band. The processor computes the coefficients of the basis expansion model using a group sparse least-absolute-shrinkage-and-selection operator (GS-Lasso).

The details of one or more examples are set forth in the accompanying drawings and the description below.

DETAILED DESCRIPTION

Figure 1:
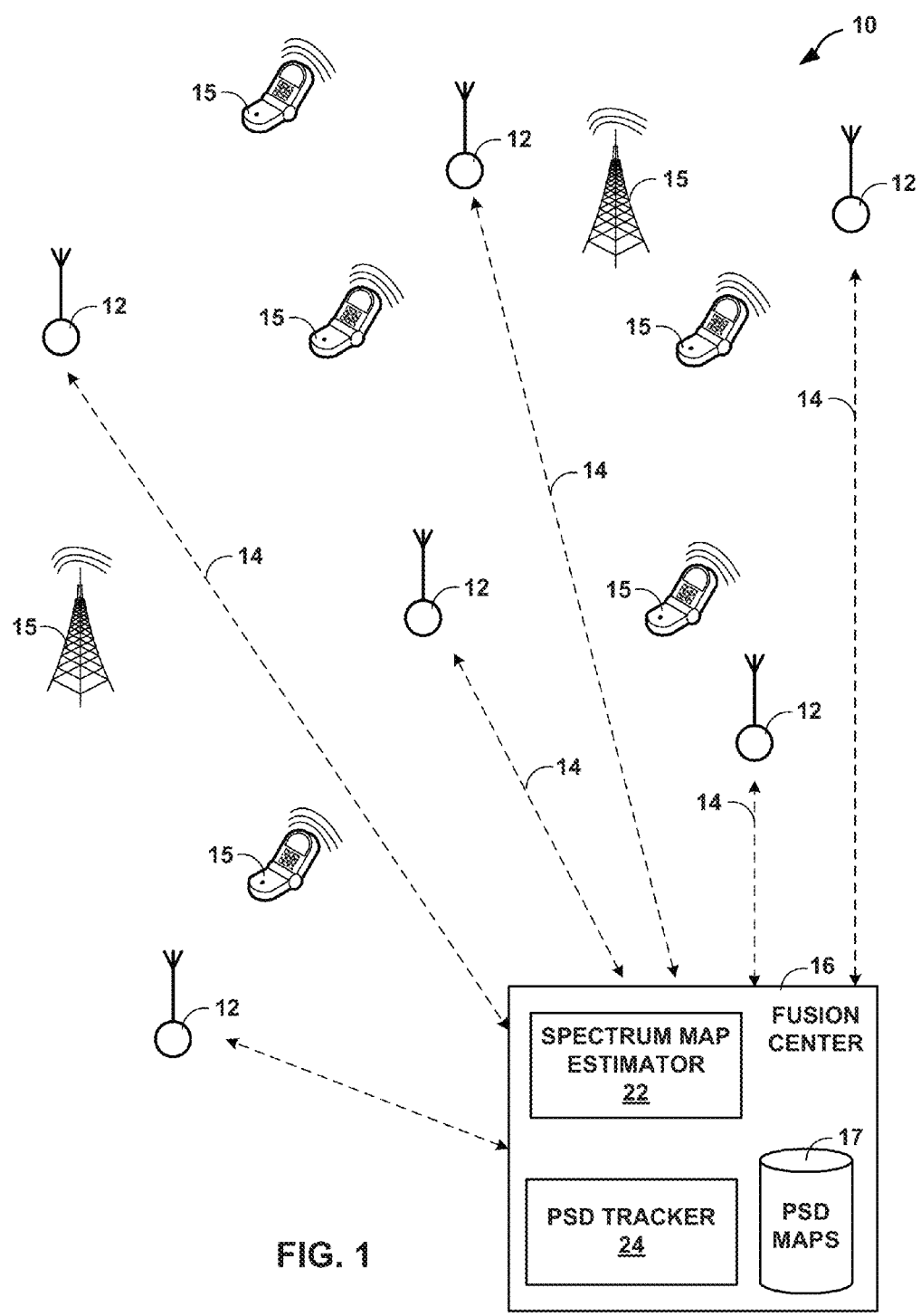
FIG. 1 is a block diagram illustrating a system in which a plurality of sensors and a centralized computing center cooperate to construct PSD maps.
Figure 2:
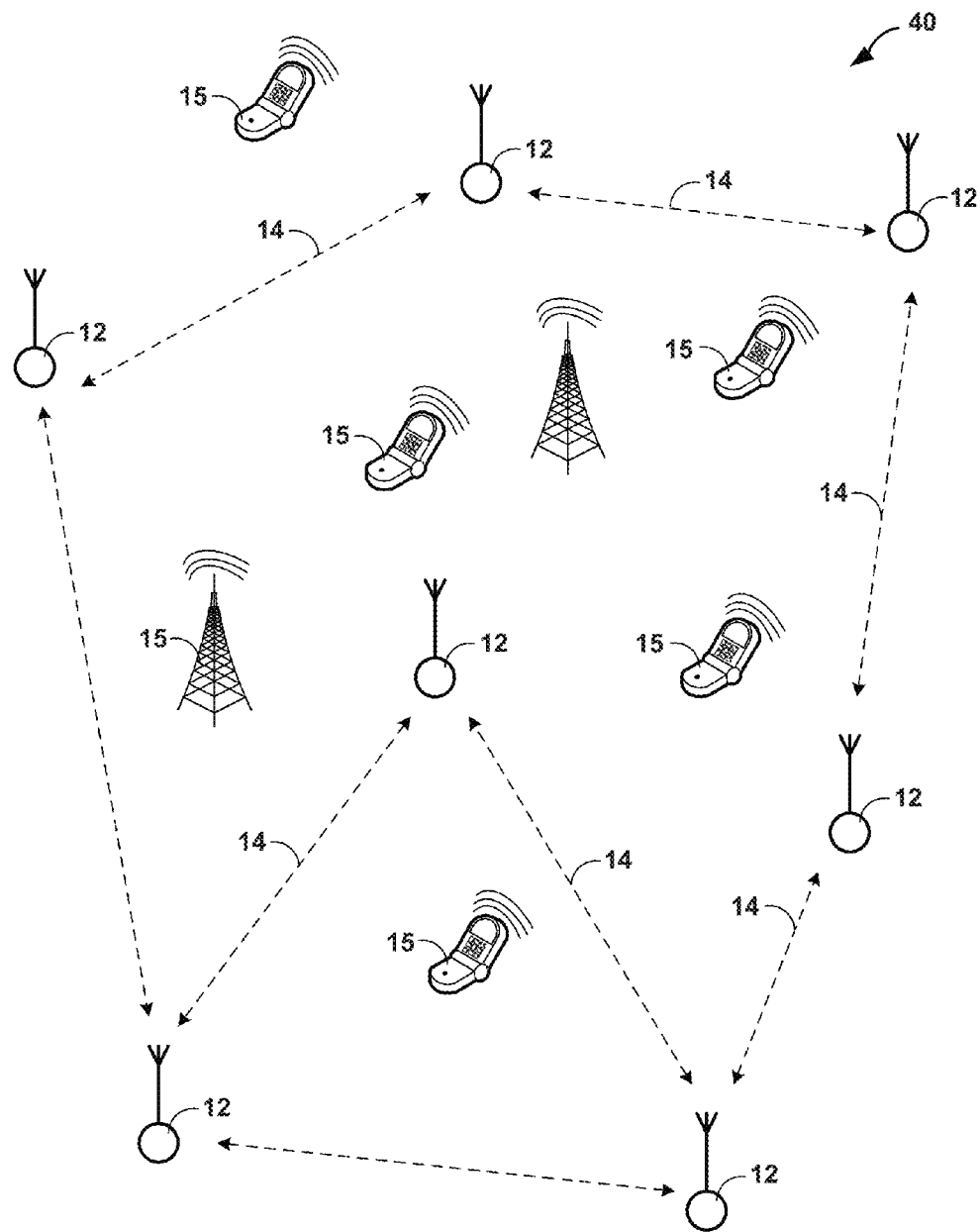
FIG. 2 is a block diagram illustrating a system in which a plurality of sensors executed distributed techniques to construct PSD maps.

FIG. 1 is a block diagram illustrating a system 10 in which a plurality of sensors 12 (e.g., cognitive radios (CR) in this example) deployed within a spatial region. Each of CRs 12 sense the ambient interference spectrum from other RF-enabled devices 15 within its surrounding region and communicate the sensed observations to one another via messages 14. CRs 12 collaborate to construct one or more power spectral density (PSD) maps based on the exchanged PSD observations. In general, the PSD maps are representative of the distribution of radio frequency (RF) power as a function of both frequency and spatial location within the geographic region. In the example of FIG. 2, system 10 includes a centralized fusion center (FC) 16 that performs the techniques described herein to compute the PSD maps 17 based on the sensed observations relayed to the fusion center via the CRs. In one example of system 10, FC 16 includes and maintains PSD maps 17 within a database along with location data for each of CRs 12. Each location may, for example, be represented as a position vector within the geographic region. A dedicated control channel may be established by which CRs 12 exchange PSD observations via messages 14, which are ultimately related to FC 16 by those CRs in communication with the FC.

In general, FC 16 is a computing system of one or more computing devices that applies the techniques described herein to compute one or more PSD maps for the geographic region. In one example, FC 16 applies robust parametric basis pursuit as a form of signal expansion for construction PSD maps based on the observations. FC may, for example, compute the basis expansion model from the sensed RF interference spectrum at each of the CRs 12 to construct a power spectral density (PSD) map representative of the distribution of RF power throughout the geographic region as a function of frequency and location. In general, a basis expansion model consists of a superposition of shifted and scaled versions of reference basis functions. The reference basis functions represent the frequency distribution of the RF power, i.e., RF power present at different frequency slots. The basis expansion model may be computed as a plurality of reference basis functions having corresponding coefficients, each of the reference basis functions representing a power emitted by an RF-enabled device 15 on a corresponding frequency band. As used herein, a paramentric basis expansion model refers to a basis expansion model where scaling coefficients of the reference basis functions are computed as scalars.

Moreover, as described below, FC 16 may apply a group sparse least-absolute-shrinkage-and-selection operator (GS-Lasso) in computing the coefficients of the basis expansion model. In general, least-absolute-shrinkage-and-selection operator (LASSO) is one example of a compressive sensing operator. Group sparse (GS) LASSO techniques are described in which a group sparsity structure for the basis expansion model is encoded and enforced. In this way, as further described below, a parametric PSD map representative of the power distribution of the RF power can be recovered, i.e., computed, with fewer measurements. The GS Lasso operator, in effect, is applied to select which coefficients in the model are non-zero and are to be estimated by FC 16. For example, in accordance with the techniques described herein, the group sparse Lasso (GS Lasso) identifies the locations in space where and RF-enabled device 15 is actively transmitting, and the frequency band(s) where transmission occurs. Specifically, by application of the GS Lasso described herein, non-zero coefficients in the basis expansion model for a transmitter's location correspond to occupied bands. In this way, FC 16 may apply the GS Lasso operator described herein to enforce group sparsity within the basis expansion model, thereby reflecting sparsity within system 10 that may arise due to geographic sparsity of sensors RF-enabled devices 15 within the measured environment and sparsity in the frequency domain since individual transmissions may occupy small portions of the spectrum. In some cases, FC 16 may use a most parsimonious sparse signal expansion using an over-complete basis set may be used to constructing the PSD maps.

Consider an incumbent PU system comprising $N_s$ transmitters (sources) located in a geographical area $A \subset R^2$. Their activity over a frequency band B is to be monitored via cooperation of $N_r$ CRs, also located in A. Let $S:=\{x_s \in A\}_{s=1}^{N_s}$ denote the PU locations. The sensing objective is to localize the PU sources, and reveal available portions of B for the CRs to transmit opportunistically.

Let $u_s(t)$ be the (unknown) signal transmitted by PU s at time t. Then, the signal received at CR position $x_r$ at time t can be expressed as $$y_r(t) := \sum_{s=1}^{N_s} \sum_{l=0}^{L_{sr}-1} h_{x_s \to x_r}(t;l) u_s(t-l) + v(t)$$

where $h_{x_s \to x_r}(t;l)$ is the l-th tap of the time-varying channel impulse response of the link $x_s \to x_r$, and v(t) denotes the additive white noise. Regarding signals $\{u_s(t)\}$, the following is assumed.

(As1) Sources $\{u_s(t)\}$ are stationary, mutually uncorrelated, independent of $\{h_{x_s \to x_r}(t;l)\}$, with vanishing correlation per channel coherence interval.

Figure 3:
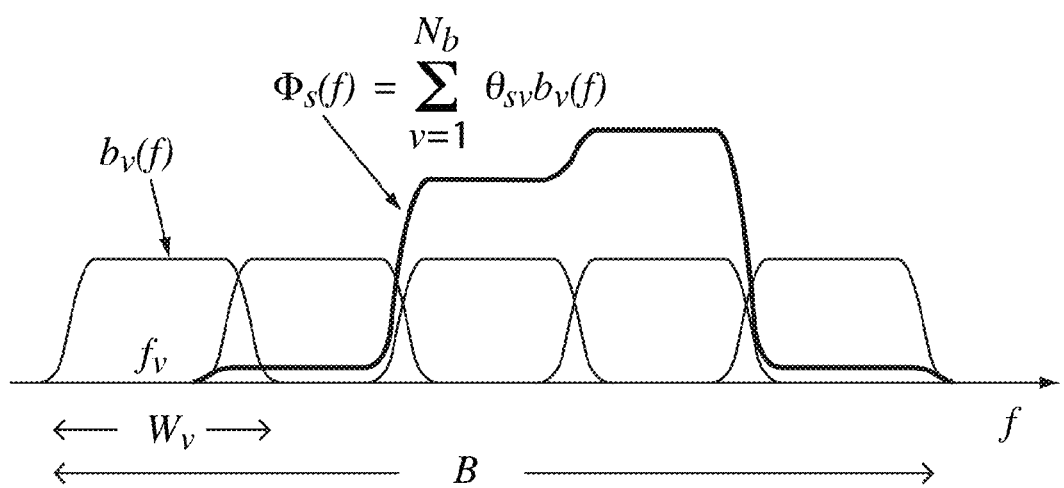
FIG. 3 illustrates a basis expansion model with overlapping raised cosine pulses.

Consider approximating the transmit-PSD of PU s using the following basis expansion model:

$$\Phi_s(f) = \sum_{v=1}^{N_b} \Theta_{sv} b_v(f), \quad s = 1, 2, \ldots, N_s \quad (1)$$

where $N_b$ is assumed sufficiently large, and $\{\Theta_{sv}\}_{v=1}^{N_b}$ are nonnegative coefficients. Possible choices of $\{b_v(f)\}_{v=1}^{N_b}$ include the set of non-overlapping rectangles of unit height spanning the bandwidth B of interest. In this case, each $\Theta_{sv}$ represents the power emitted by source s on the frequency band corresponding to the basis function $b_v(f)$. Alternatively, overlapping raised cosine bases can be employed with support $B_v = [f_v - (1+\varrho/2T_s), f_v + (1+\varrho/2T_s)]$, where $\varrho$ is the roll-off factor and $T_s$ the symbol period, can be employed; see also FIG. 3.

Channel $\{h_{x_s \to x_r}(t;l)\}$ can be decomposed as $$h_{x_s \to x_r}(t;l) = (\gamma_{x_s \to x_r} s_{x_s \to x_r})^{\frac{1}{2f}} x_s \to x_r(t;l),$$

where $\gamma_{x_s \to x_r}$ stands for the path loss, $s_{x_s \to x_r}$ the temporally- and spatially-colored shadowing, and $\{f_{x_s \to x_r}(t;l)\}$ for the multi-path fast time-varying fading. The latter satisfies the following. (As2) Variables $\{f_{x_s \to x_r}(t;l)\}$ are complex Gaussian with zero mean and variance $\sigma_{f,sr}^2$, stationary with respect to t, and uncorrelated across the lag variable l and the spatial variables $x_s$ and $x_r$. Without loss of generality, assume that $$\sum_{l=1}^{L_{sr}} \sigma_{f,sr}^2 = 1$$

for every s and r.

Received samples $\{y_r(t)\}$ are parsed into N-dimensional blocks, where N is chosen equal to (or smaller than) the coherence interval of the small-scale fading, over which $h_{x_s \to x_r}(t;l)$ remains approximately invariant with respect to (wrt) t. These data blocks are hereafter indexed by n, so that t=nN+m, with m=0, 1, . . . , N−1.

Shadowing and small-scale fading are characterized by different dynamics. The following is assumed regarding channel propagation and modeling.

(As3) The coherence interval of shadow fading exceeds that of $f_{x_s \to x_r}(t;l)$. Also, shadowing variations are sufficiently slower than the coherence interval of the PU signals.

Based on (As1)-(As3), it is possible to express the PSD measured at location x due to $N_s$ simultaneous PU transmissions as $$\Phi_x(f) = \sum_{s=1}^{N_s} g_{x_s \to x} \Phi_s(f) + \sigma_v^2 = \sum_{s=1}^{N_s} g_{x_s \to x} \sum_{v=1}^{N_b} \Theta_{sv} b_v(f) + \sigma_v^2 \quad (2)$$

where $\sigma_v^2$ denotes noise variance at the receiver, and $g_{x_s \to x_r} := \gamma_{x_s \to x_r} s_{x_s \to x_r}$ the averaged channel gain.

As neither the number of PU sources nor their locations are known to the CRs, a set of $N_g$ candidate transmit-PUs is postulated on a grid of locations $G:=\{x_g \in A\}_{g=1}^{N_g}$. Without prior knowledge of the area(s) where PU activity is more likely, the set of candidate locations G can be simply formed by discretizing A to the set of grid points G.

Define the $N_b \times 1$ vector $\Theta_g := [\Theta_{g1}, \ldots, \Theta_{gN_b}]^T$ collecting the basis coefficients that correspond to location $x_g$, and let $\Theta := [\Theta_1^T, \ldots, \Theta_{N_g}^T]^T$; also, let $B_{x_r}$ be the $N \times N_b N_g$ matrix $B_{x_r} := [b_{x_r}(f_1), \ldots, b_{x_r}(f_N)]^T$, with $b_{x_r}(f_k)$ having entries $\{g_{x_g \to x_r} \cdot b_v(f_k)\}$. Then, upon defining $\phi_{x_r} := [\Phi_{x_r}(f_1), \ldots, \Phi_{x_r}(f_N)]^T$, the received PSD at CR location $x_r$, sampled at frequencies $\{f_k\}_{k=1}^N$, can be compactly written as:

$$\phi_{x_r} = B_{x_r} \Theta + \sigma_v^2 1_N. \quad (3)$$

The sensing objective of revealing PU locations and the available portions (sub-bands) of B is tantamount to estimating $\Theta$. To this end, CRs rely on the periodogram estimate of $\Phi_{x_r}(f)$ at the sampling locations $\{x_r\}_{r=1}^{N_r}$, and N frequency bins $\{f_k\}_{k=1}^N$. The fast Fourier transform of samples $\{y_r(t)\}$, namely $Y_{r,N}(n,f)$, and the periodogram $\hat{\varphi}_{x_r,N}(n;f) := (1/N)|Y_{r,N}(n,f)|^2$ are computed per data block n. To average out small-scale fading effects, and allow for tracking of shadow fading as well as possible variations of the PUs' power spectra, the periodogram estimate at CR r is formed using an exponentially weighted moving average operation as $$\hat{\Phi}_{x_r}(\tau, f) := \sum_{n=1}^{\tau} \alpha^{\tau-n} \varphi_{x_r, N}(n,f) \quad (4)$$

with $\alpha \in (0,1]$ denoting the so-called forgetting factor. As shown gives an estimate of the PSD measured at point $x_r$, and frequency f as $$\hat{\Phi}_{x_r}(\tau;f) = \Phi_{x_r}(\tau;f) + e_{x_r,N}(\tau;f) \quad (5)$$

with (asymptotic) variance bounded as $$\lim_{N \to \infty} \text{var}[e_{r,N}(\tau; f)] \leq \frac{3}{2}(1-\alpha)\Phi_{x_r}^2(f).$$

After dropping $\tau$ for notational brevity, let $\hat{\phi}_{x_r} := [\hat{\Phi}_x(f_1), \ldots, \hat{\Phi}_x(f_N)]^T$.

Based on the linear model (3), the sensing objective is to estimate $\Theta$ from the received-PSD estimate $$\hat{\phi} := [\hat{\phi}_{x_1}, \ldots, \hat{\phi}_{x_{N_r}}]^T$$

gathered at CR locations $\{x_r\}_{r=1}^{N_r}$.

The following describes spectrum sensing via Group Sparse Lasso. The number of active PUs transmitting over the same spectral band in a given area is naturally limited by mutual interference. As a consequence, the number of PU sources ($N_s$) is far smaller than $N_g$, for a sufficiently dense grid. Absence of PU sources in most grid locations gives rise to a group sparsity of the vector $\Theta$, since $\Theta_g = 0_{N_b}$ for each of the locations $x_g$ that are not occupied by a PU transmitter. In addition to space, sparsity in the vector $\Theta$ is also manifested in the frequency domain because of the parsimonious linear model (2). Compared to the possibly large swath of frequencies that the CRs can sense, individual PU transmissions typically occupy small portions of the spectrum (say, in the order of MHz). Sparsity in the frequency domain implies that individual entries within each group $\Theta_g$ are zero.

One criterion for estimating $\Theta$ is the (non-negative) least-squares (LS). However, LS fails to provide a parsimonious model estimate involving only the prominent variables. The Lasso and the so-called group Lasso on the other hand, were proposed to overcome such a limitation of LS. In the Lasso criterion, the LS cost is augmented with the $l_1$-norm $|\Theta|_1$ to encourage sparsity at the single-coefficient level; while in the group Lasso, the regularization term $$R_G(\Theta) := \sum_{g=1}^{N_g} |\Theta_g|_2$$

is referred to herein as a group sparse (GS) penalty that enforces group sparsity within the model.

Combining Lasso with group Lasso, the so-called group sparse (GS-)Lasso provides a parsimonious model estimate, where sparsity is accounted for both at the group- and at the single-coefficient levels. This hierarchical sparsity is possible by regularizing the conventional LS cost with the term $$R_G(\Theta) := \sum_{g=1}^{N_g} |\Theta_g|_2$$

combined with $|\Theta|_1$.

Taking also into account the non-negativity of PU power spectra, $\Theta$ can be estimated by solving the following sparse regression problem, where $\Theta$ indicates the location in space and the frequency band for any active transmitter (RF-enabled device 15):

$$\hat{\theta} = \arg\min_{\theta \geq 0_{N_b N_g}} \left[ \frac{1}{2} \sum_{r=1}^{N_r} \|\hat{\phi}_{x_r} - B_{x_r}\theta - \sigma_v^2 1_N\|_2^2 + \lambda_1 \|\theta\|_1 + \lambda_2 R_G(\theta) \right] \quad (6)$$

where the coefficient $\lambda_1 \geq 0$ enforces sparsity at individual entries, whereas $\lambda_2 \geq 0$ promotes group sparsity. For $\lambda_1 = 0$ ($\lambda_2 = 0$), (6) reduces to the Lasso (group Lasso) based estimate. In this way, the group sparse Lasso (GS Lasso) identifies the locations in space where and RF-enabled device 15 is actively transmitting, and the frequency band(s) where transmission occurs. Specifically, non-zero coefficients in the basis expansion model for a transmitter's location correspond to occupied bands. PU localization and PSD estimation was viewed as a sparse linear regression model; here, the formulation is considerably broadened by taking into account both individual and group sparsity.

To obtain regression matrices $\{B_{x_r}\}$, the channel gains $\{g_{x_g \to x_r}\}$ need to be estimated. To this end, CRs can simply neglect shadowing, and in resort to the distance-dependent path loss model $\hat{g}_{x_g \to x_r} = \min\{1, (\|x_g - x_r\|_2/d_0)^{-\eta}\}$, where $d_0$ and $\eta$ are preselected constants depending on the propagation environment. Alternatively, more sophisticated techniques can be employed. Perturbations in the regression matrices $\{B_{x_r}\}$ arising due to inaccurate channel estimation and grid-mismatch effects are dealt with below.

With respect to the PSD atlas, it is worth re-iterating that identifying the support of the vector $\Theta$ reveals not only the primary sub-bands occupied, but also the locations where the active PU transmitters reside. Complementing this information with either the PUs' channel gain maps or a simple path loss-based propagation model, CRs can readily reconstruct the PSD atlas; that is, estimate PSD maps at any location of the monitored area as $$\hat{\Phi}_x(f) = \sum_{g=1}^{N_g} \hat{g}_{x_g \to x} \sum_{v=1}^{N_b} \hat{\Theta}_{gv} b_v(f), \forall x \in A \quad (7)$$

with $\hat{g}_{x_g \to x}$ the estimate of $g_{x_g \to x}$. Having available estimates of the PSD map across space per frequency band (hence the term atlas), CRs can adjust their transmit power to prevent harmful interference inflicted to the PUs. In fact, the positions of potential PU receivers can be deduced from the PSD atlas; and thus, CR transmission powers can be properly adapted.

ADMoM-based Solver: In this section, a reduced-complexity algorithm attaining the optimal solution of GS-Lasso problems will be developed using the alternating direction method of multipliers (ADMoM). The disclosure show that (6) admits an equivalent reformulation that can be solved via ADMoM. Before doing so, the following lemmas are needed.

Lemma 1 Consider the following convex minimization problem in the variable $y \in R^N$ $$y^* = \arg\min_y \left[ \frac{c}{2} y^T y - y^T a + \lambda |y|_2 \right]. \quad (8)$$

Albeit non differentiable, (8) admits a closed-form solution. Specifically, the global minimizer $y^*$ is given by the following soft-thresholding vector operation expressed in terms of $[a]_+ := \max\{0, a\}$ as $$y^* = \frac{a}{c|a|_2} [|a|_2 - \lambda]_+. \quad (9)$$

Proof. It will be argued that the solver of (8) takes the form $y = za$ for some scalar $z \geq 0$. This is because among all y with the time $l_2$-norm, the Cauchy-Schwarz inequality implies that the maximizer of $a^T y$ is collinear with (and in the same direction of) a. Substituting y=za into (8) renders the problem scalar z≥0, with solution $z^*=(\|a\|-\lambda)_+/(c\|a\|_2)$, which completes the proof.

Lemma 2 Consider the following non-smooth convex problem in the vector variable $y \in R^N$ $$y^* = \operatorname{argmin}_y \left[ \frac{c}{2} y^T y - a^T y + \lambda |y|_1 \right]. \quad (10)$$

Using operator $T_\lambda(\cdot)$ defined as $$T_\lambda(a) := [\operatorname{sgn}(a_1)[|a_1|-\lambda]_+, \ldots, \operatorname{sgn}(a_N)[|a_N|-\lambda]_+]^T$$

the global minimized of (10) can be written as $$y^* = \frac{1}{c} T_\lambda(a). \quad (11)$$

If non-negativity of the entries in y is imposed, the solution of (10) subject to $y \geq 0_N$ is obtained by using the vector soft-thresholding operator $$T_\lambda^+(a) := [\max\{0, a_1 - \lambda\}, \ldots, \max\{0, a_N - \lambda\}]^T \quad (12)$$

as $$y^* = \frac{1}{c} T_\lambda^+(a).$$

Proof. Note first that (12) can be solved element-wise; specifically, each entry $y_i$ of y is found by solving the scalar problem $y^*_i = \arg\min_y C(y) := (c/2y^2 - \alpha_i y + \lambda |y|)$, which has a non-differentiable cost. The necessary and sufficient condition for $y^*_i$ to minimize C(y) is [27, p. 92]

$$\begin{cases} |a_i| \leq \lambda, & \text{if } y_i^* = 0 \\ cy_i^* - a + \lambda \frac{y_i^*}{|y_i^*|} = 0, & \text{if } y_i^* \neq 0 \end{cases} \quad (13)$$

which is satisfied by $y^*_i = \operatorname{sgn}(\alpha_i)[|\alpha_i|-\lambda]_+$; see also [21]. When y is enforced to be non-negative, solution (12) can be easily derived from (13) element-wise. □

Consider now the $N_b N_g \times 1$ auxiliary vector variables γ and ξ, and neglect irrelevant terms to re-write the GS-Lasso problem as:

$$\{\hat{\theta}, \hat{\gamma}, \hat{\xi}\} = \operatorname*{argmin}_{\theta, \gamma, \xi} \left[ \frac{1}{2} R\theta - \theta^T I + \lambda_1 \|\xi\|_1 + \lambda_2 \mathcal{R}_G(\gamma) \right] \quad (14)$$

s.t. $\xi \geq 0_{N_b N_g}$ $\theta = \gamma,$ $\theta = \xi$ where $R := \sum_{r=1}^{N_r} B_{x_r}^T B_{x_r}$, $r := \sum_{r=1}^{N_r} B_{x_r}^T \bar{\phi}_{x_r}$, and $\bar{\phi}_{x_r} := \hat{\phi}_{x_r} - \sigma_v^L 1_N$. For simplicity, $\sigma_v^2$ is assumed to be known; however, it could be incorporated in (14) and estimated as the intercept.

Letting η and μ denote the Lagrange multipliers associated with the equality constraints Θ=γ and Θ=ξ, respectively, the quadratically augmented Lagrangian function of problem (14) is $$\mathcal{L}(\theta, \gamma, \xi, \eta, \mu) = \frac{1}{2} \theta^T R \theta - \theta^T r + \lambda_1 \|\xi\|_1 + \lambda_2 \mathcal{R}_G(\gamma) + \quad (15)$$

$$\eta^T(\theta - \gamma) + \mu^T(\theta - \xi) + \frac{c_1}{2}\|\theta - \gamma\|_2^2 + \frac{c_2}{2}\|\theta - \xi\|_2^2$$

where $c_1, c_2 > 0$ are arbitrary constants. Then, for any initial vectors $\gamma^{(0)}, \xi^{(0)}, \eta^{(0)}, \mu^{(0)}$, the ADMoM algorithm entails the following primal-dual iterative updates $$\theta^{(j)} = \operatorname*{argmin}_\theta \mathcal{L}(\theta, \gamma^{(j-1)}, \xi^{(j-1)}, \eta^{(j-1)}, \mu^{(j-1)}) \quad (16a)$$

$$\{\gamma^{(j)}, \xi^{(j)}\} = \operatorname*{argmin}_{\gamma, \xi \geq 0} \mathcal{L}(\theta^{(j)}, \gamma, \xi, \eta^{(j-1)}, \mu^{(j-1)}) \quad (16b)$$

$$\eta^{(j)} = \eta^{(j-1)} + c_1(\theta^{(j)} - \gamma^{(j)}) \quad (16c)$$

$$\mu^{(j)} = \mu^{(j-1)} + c_2(\theta^{(j)} - \xi^{(j)}) \quad (16d)$$

where j=1, 2, . . . is the iteration index. The first step updates the primal vector $\Theta^{(j)}$ by using the values of the auxiliary variables and the Lagrange multipliers obtained at the previous iteration j−1; since L(·) is quadratic in Θ, the convex optimization problem (16a) can be solved in closed form as $$\theta^{(j)} = (R + (c_1+c_2)I_{N_b N_g})^{-1} \times (r + c_1\gamma^{(j-1)} + c_2\xi^{(j-1)} - \eta^{(j-1)} - \mu^{(j-1)}). \quad (17)$$

Next, variables γ and ξ can be updated using the newly computed vector $\theta^{(j)}$, with the Lagrange multipliers fixed from the previous iteration. Inspection of the function $L(\theta^{(j)}, \gamma, \xi, \eta^{(j-1)}, \mu^{(j-1)})$ reveals that (16b) can be split into two sub-problems, where minimization over γ and ξ can be performed separately. After neglecting irrelevant terms, minimization of (16b) wrt γ reduces to the following non-differentiable convex problem $$\gamma^{(j)} = \operatorname*{argmin}_\gamma \left[ \frac{c_1}{2} \gamma^T \gamma - \gamma^T (c_1 \theta^{(j)} + \eta^{(j-1)}) + \lambda_2 \mathcal{R}_G(\gamma) \right] \quad (18)$$

which, in turn, can be separated in following $N_g$ sub-problems $$\gamma_g^{(j)} = \operatorname*{argmin}_{\gamma_g} \left[ \frac{c_1}{2} \gamma_g^T \gamma_g - \gamma_g^T (c_1 \theta_g^{(j)} + \eta_g^{(j-1)}) + \lambda_2 \|\gamma_g\|_2 \right], \quad (19)$$

$$g = 1, \ldots, N_g$$

where $\gamma_g$ and $\eta_g$ are $N_b \times 1$ sub-vectors of γ and η, respectively, collecting elements $\{\gamma_n\}_{n=N_g(g-1)+1}^{N_g g}$ and $\{\eta_n\}_{n=N_g(g-1)+1}^{N_g g}$.

From Lemma 1, the global minimizer of each sub-problem (19) is given by $$\gamma_g^{(j)} = (\Theta_g^{(j)} + c_1^{-1}\eta_g^{(j-1)}) \frac{[-c_1\Theta_g^{(j)} + \eta_g^{(j-1)} - 2 - \lambda_2]_+}{-c_1\Theta_g^{(j)} + \eta_g^{(j-1)} - 2}. \quad (20)$$

Upon neglecting constant terms, minimization of (16b) wrt the non-negative variable ξ can be obtained after solving the following non-smooth convex problem $$\xi^{(j)} = argmin_{\xi \geq 0} \left[ \frac{c_2}{2} \xi T_{\xi-\xi} T(\mu^{(j-1)} + c_2 \Theta^{(j)}) + \lambda_1 \|\xi\|_1 \right] \quad (21)$$

which, from Lemma 2, admits the following closed-form solution $$\xi^{(j)} = \frac{1}{c_2} T^+_{\lambda_1}(c_2 \Theta^{(j)} + \mu^{(j-1)}). \quad (22)$$

The overall ADMoM-based solver for GS-Lasso problems is tabulated as Algorithm 1.

---
Algorithm 1 ADMoM-based GS-Lasso solver
---
Initialize $\gamma^{(0)} = 0_{N_b N_g}$, $\xi^{(0)} = 0_{N_b N_g}$, $\eta^{(0)} = 0_{N_b N_g}$, and $\mu^{(0)} = 0_{N_b N_g}$
Form R and r
for j = 0, 1, ... do
  Update $\Theta^{(j)}$ via (17)
  Update $\gamma_g^{(j)}$ via (20) for all g = 1, ..., $N_g$
  Update $\xi^{(j)}$ via (22)
  Update $\eta^{(j)} = \eta^{(j-1)} + c_1(\Theta^{(j)} - \gamma^{(j)})$
  Update $\mu^{(j)} = \mu^{(j-1)} + c_2(\Theta^{(j)} - \xi^{(j)})$
end for

---

The distinct feature of the proposed ADMoM-based algorithm for solving the GS-Lasso problem (14) is its computationally affordable implementation, offered by the closed-form expressions for the primal variable updates; as well as the simple updates of the dual variables $\eta^{(j)}$ and $\mu^{(j)}$. Furthermore, since ADMoM has provable convergence to the global minimizer when the considered problem is convex, convergence of the proposed algorithm to $\hat{\Theta}$ in (6) is ensured as stated next.

Proposition 1

For any $c_1, c_2 > 0$ and any initializing vectors $\gamma^{(0)}, \xi^{(0)}, \eta^{(0)}$ and $\mu^{(0)}$, the iterates (17) for $\Theta^{(j)}$, ( ) for $\{\gamma_g^{(j)}\}$, ( ) for $\xi^{(j)}$, and (16c)(16d) for $\eta^{(j)}$ and $\mu^{(j)}$, respectively, are convergent. Also, $\Theta^{(j)}$ converges to the solution of the GS-Lasso (6); i.e., $$\lim_{j \to +\infty} \Theta^{(j)} \triangleq \Theta.$$

Shadow fading as well as possible slow temporal variations of the PU transmit-PSDs lead to time-varying $\{\Phi_{x_r}(f)\}$. Following the lines, time-varying PSDs can be tracked by employing the following time-weighted version of the GS-Lasso.

$$\hat{\theta}(t) = \quad (23)$$
$$\arg \min_{\theta \geq 0_{N_b N_g}} \left[ \frac{1}{2} \sum_{\tau=1}^{t} \sum_{r=1}^{N_\tau} \beta_{\tau,t} \|\hat{\varphi}_{x_r}(\tau) - B_{x_r}(\tau)\theta\|_2^2 + \lambda_1 \|\theta\|_1 + \lambda_2 \mathcal{R}_G(\theta) \right]$$

where $\beta_{\tau,t} \in (0,1]$ is the so-called forgetting factor, and index $\tau = 1, \ldots, t$ emphasizes the temporal variability of channels and received PSDs. Also, to address the need for real-time processing, the estimation of $\theta$ in (23) can be performed on-line, where each iteration of the ADMoM algorithm is performed after acquiring new estimates $\{\phi_{x_r}(\tau)\}$. In this case, the ADMoM iteration index j coincides with the temporal index $\tau$.

Algorithm 1 is centralized, meaning that the whole set of PSD estimates $\{\phi_{x_r}\}_{r=1}^{N_r}$ are available at either an FC or a CR cluster head. To reduce the considerable message-passing overhead associated with globally sharing PSD measurements across CRs, and to address scalability and robustness concerns (FC constitutes an isolated point of failure), a distributed counterpart of Algorithm 1 can be derived along the lines.

Techniques for Spectrum Sensing under Channel Uncertainties are now described, in including a Group Sparse Total Least-Squares (TLS) technique.

Uncertainty in the matrices $\{B_{x_r}\}$ is manifested because of (i) errors in the estimates of $\{g_{x_g \to x_r}\}$ (with or without accounting for shadowing; (ii) grid offsets when PUs are located between grid points; and, (iii) basis expansion approximation errors. To cope with these perturbations, a robust version of the GS-Lasso is developed in this section. That is, TLS may be applied as described herein to address situations having perturbed compressive sampling, which may arise whenever any of the uncertainties result in a mismatch between actual and estimated bases reference functions computed for the model.

TLS is the workhorse used for estimating non-sparse vectors obeying an over-determined linear system of equations with uncertainty present in both the regression matrix and the observations (fully-perturbed model). Sparsity in the estimate was taken into account, where the TLS framework was extended to solve sparse under-determined fully-perturbed linear systems. The sparse TLS approach is broadened here to account for sparsity present both at individual entries, and also at groups of entries.

Define $$B := [B^T_{x_1}, \ldots, B^T_{x_{N_r}}]^T,$$

and let $$\bar{\phi} := [\phi^T_{x_1}, \ldots, \phi^T_{x_{N_r}}]^T,$$

and E a $NN_r \times N_g N_b$ matrix capturing perturbations corrupting the matrix B. Consider now estimating $\Theta$ as follows:

$$\{\hat{\theta}, \hat{E}\} = \arg \min_{\substack{E \\ \theta \geq 0_{N_b N_g}}} \left[ \frac{1}{2} \|\bar{\varphi} - (B+E)\theta\|_2^2 + \frac{1}{2} \|E\|_F^2 + \lambda_1 \|\theta\|_1 + \lambda_2 \mathcal{R}_G(\theta) \right]. \quad (24)$$

Relative to the classical TLS, the cost in the group sparse (GS-)TLS problem (24) is augmented with the regularization terms accounting for the two forms of sparsity inherent to $\Theta$. Compared to, problem (24) includes also the term $\lambda_2 \mathcal{R}_G(\Theta)$.

Problem (24) is generally non-convex due to the presence of the product $E\Theta$; thus, it is in general difficult to obtain a globally-optimal solution. However, a novel reduced-complexity algorithm with provable convergence to a stationary point of (24) will be developed in the ensuing section.

An Alternating Descent Solver is no described. The cost in (24) will be optimized here iteratively using a block coordinate descent algorithm, which cyclically minimizes it wrt E (keeping $\Theta$ fixed), and wrt $\Theta$ after fixing E. Specifically, the following two steps are performed at the i-th iteration:

(i1) Fix $E = \hat{E}^{(i-1)}$, (25)

and update $\hat{\theta}^{(i)}$ as $$\hat{\theta}^{(i)} = \arg\min_{\theta \geq 0_{N_b N_g}} \left[ \frac{1}{2} \|\bar{\varphi} - (B + \hat{E}^{(i-1)})\theta\|_2^2 + \lambda_1 \|\theta\|_1 + \lambda_2 \mathcal{R}_G(\theta) \right].$$

(i2) Fix $\theta = \hat{\theta}^{(i)}$, (26)

and obtain $\hat{E}^{(i)}$ as $$\hat{E}^{(i)} = \arg\min_E \frac{1}{2} \|\bar{\varphi} B \hat{\theta}^{(i)} - E\hat{\theta}^{(i)}\|_2^2 + \frac{1}{2}\|E\|_F^2.$$

By fixing $\hat{E}^{(i)}$, (24) boils down to a GS-Lasso problem; thus, $\hat{\Theta}^{(i)}$ can be computed by using the ADMoM-based solver after replacing (17) with the following update, where j still represents the index for the (inner) ADMoM iterations:

$$\hat{\theta}^{(i,j)} = \left[ (B + \hat{E}^{(i-1)})^T (B + \hat{E}^{(i-1)}) + (c_1 + c_2) I_{N_b N_g} \right]^{-1} \times \quad (27)$$
$$\left[ (B + \hat{E}^{(i-1)})^T \bar{\varphi} + c_1 \gamma^{(j-1)} + c_2 \xi^{(j-1)} - \eta^{(j-1)} - \mu^{(j-1)} \right].$$

The quadratic convex problem (26) admits the following closed form solution $$\hat{E}^{(i)} = (1 + \|\hat{\theta}^{(i)}\|_2^2)^{-1} [\bar{\varphi} - B\hat{\theta}^{(i)}] \hat{\theta}^{(i)T} \quad (28)$$

which can be obtained after equating the derivative of the cost in (26) with zero. The overall solver for GS-TLS is tabulated as Algorithm 2.

---

Algorithm 2 GS-TLS

Initialize $\hat{E}^{(0)} = 0_{N_b N_g \times N_b N_g}$
while Stopping criterion is not satisfied (i iteration index) do
 Initialize $\gamma^{(0)} = 0_{N_b N_g}$, $\xi^{(0)} = 0_{N_b N_g}$, $\eta^{(0)} = 0_{N_b N_g}$, $\mu^{(0)} = 0_{N_b N_g}$
 While Stopping criterion is not satisfied (j iteration index) do
  Update $\theta^{(i,j)}$ via (27)
  Update $\gamma_g^j$ via (20) with $\theta^{(i,j)}$ in place of $\theta^{(j)}$, for all g = 1,..., $N_g$
  Update $\xi^{(j)}$ via 22) with $\theta^{(i,j)}$ in place of $\theta^{(j)}$
  Update $\eta^{(j)} = \eta^{(j-1)} + c_1 (\theta^{(i,j)} - \gamma^{(j)})$
  Update $\mu^{(j)} = \mu^{(j-1)} + c_2 (\theta^{(i,j)} - \xi^{(j)})$
 end while
 Update $\hat{\theta}^{(i)} = \theta^{(i,j)}$
 Update $\hat{E}^{(i)} = (1 + \|\hat{\theta}^{(i)}\|_2^2)^{-1} [\bar{\varphi} - B\hat{\theta}^{(i)}] \hat{\theta}^{(i)T}$
end while

---

Under certain conditions, the block coordinate descent algorithm is known to converge (at least) to a local optimum point, as asserted next.

---

Algorithm 3 Robust GS-TLS

Initialize $\hat{o}^{(0)} = 0_{N_b N_g}$ and $\hat{E}^{(0)} = 0_{N_b N_g \times N_b N_g}$
 while stopping criterion is not satisfied (i iteration index) do
  Initialize $\gamma^{(0)} = 0_{N_b N_g}$, $\xi^{(0)} = 0_{N_b N_g}$, $\eta^{(0)} = 0_{N_b N_g}$, and $\mu^{(0)} = 0_{N_b N_g}$
  while Stopping criterion is not satisfied (j iteration index ) do
   Update $\theta^{(i,j)}$ via (37)
   Update $\gamma_g^{(j)}$ via (20) with $\theta^{(i,j)}$ in place of $\theta^{(j)}$ for all g = 1,..., $N_g$
   Update $o^{(i,j)}$ via (38)
   Update $\xi^{(j)}$ via (22) with $\theta^{(i,j)}$ in place of $\theta^{(i)}$
   Update $\eta^{(j)} = \eta^{(j-1)} + c_1 (\theta^{(i,j)} - \gamma^{(j)})$
   Update $\mu^{(j)} = \mu^{(j-1)} + c_2 (\theta^{(i,j)} - \xi^{(j)})$
  end while
  Update $\hat{\theta}^{(i)} = \theta^{(i,j)}$ and $\hat{o}^{(i)} = o^{(i,j)}$
  Update $\hat{E}^{(i)} = (1 + \|\hat{\theta}^{(i)}\|_2^2)^{-1} [\bar{\varphi} - B\hat{\theta}^{(i)} + \hat{o}^{(i)}] \hat{\theta}^{(i)T}$
 end while

---

Proposition 2.

For any initialization $\{\hat{\theta}^{(0)}, \hat{E}^{(0)}\}$, the Iterates $\{\hat{\theta}^{(i)}, \hat{E}^{(i)}\}$ (25)-(26) converge monotonically to a stationary point of problem (4).

The following describes outlier-resilient spectrum sensing techniques, including Robust GS-TLS.

The problem dealt with in the previous section accounts for uncertainty in the entries of the regression matrix B. However, due to particularly abrupt local shadow fading, failures of the sensing modules, or unexpected narrow-band impulsive noise and/or interference, CRs observations may be affected by abundant errors. This section develops schemes for discerning and removing the observations that largely deviate from the underlying model (a.k.a. outliers).

A simple heuristic to detect unreliable data could be to estimate $\Theta$ via (24), compute the residuals and, then, reject the PSD observations whose residuals exceed a certain threshold. A systematic method that accounts for possible outliers can be found, where the underlying linear regression model is augmented by an auxiliary outlier vector. Using this model, the receiver PSD at the CR locations $\phi$ can be expressed as $$\phi = (B+E)\Theta + o + e \quad (29)$$

where the nonzero entries of the $NN_r \times 1$ real vector o capture outliers; and e is a proper vectorization of the periodogram estimation errors. Since few outliers are expected compared to the total number of data collected in $\phi$, the vector o is sparse.

Capitalizing on the three forms of sparsity emerging from (i) the grid-based model (group sparsity), (ii) the PSD basis expansion (single-coefficient sparsity) and (iii) the outliers (single-coefficient sparsity), and accounting for perturbations in the regression matrix, the following robust GS-TLS is considered. In this way, a robust GS-TLS technique is described that addresses errors introduced by uncertainties, such as estimate errors, grid offsets, and BEM approximation errors, and also handles measurement corruption by inclusion of outliers.

$$[\hat{\theta}, \hat{E}, \hat{o}] = \quad (30)$$

$$\arg\min_{\substack{o \\ E \\ \theta \geq 0_{N_b N_g}}} \left[ \frac{1}{2} \|\bar{\varphi} - (B+E)\theta + o\|_2^2 + \frac{1}{2}\|E\|_F^2 + \lambda_1 \|\theta\|_1 + \lambda_2 \mathcal{R}_G(\theta) + \lambda_3 \|o\|_1 \right]$$

where $\lambda_3 \geq 0$ promotes the (single-coefficient) sparsity of vector $\hat{o}$. The nature of the perturbations captured in E and o is in general different: o collects unmodeled errors, whereas E describes (small) perturbations. It is also worth noticing that the support of $\hat{o}$ reveals the unreliable CR data.

An alternating descent algorithm is described. Although (30) is generally a non-convex problem, a block coordinate descent algorithm can still be employed. In this case, the cost in (30) will be iteratively minimized wrt E and $\{\Theta, o\}$; that is, the following two updates are performed at the i-th iteration:

(i1) Fix $E = \hat{E}^{(i-1)}$ and solve $$\{\hat{\theta}^{(i)}, \hat{o}^{(i)}\} = \arg \min_{\substack{\theta \geq 0_{N_b N_g} \\ o}} \left[ \frac{1}{2}\|\bar{\varphi} - (B + \hat{E}^{(i-1)})\theta + o\|_2^2 + \lambda_1\|\theta\|_1 + \lambda_2 \mathcal{R}_G(\theta) + \lambda_3\|o\|_1 \right]. \quad (31)$$

(i2) Fix $\theta = \hat{\theta}^{(i)}$ and $o = \hat{o}^{(i)}$ and update $\hat{E}^{(i)}$ as $$\hat{E}^{(i)} = \arg \min_E \frac{1}{2}\|\bar{\varphi} - B\hat{\theta}^{(i)} + E\hat{\theta}^{(i)} + \hat{o}^{(i)}\|_2^2 + \frac{1}{2}\|E\|_F^2. \quad (32)$$

The quadratic problem (32) can be solved in closed form, to obtain $$\hat{E}^{(i)} = (1 + \|\hat{\theta}^{(i)}\|_2^2)^{-1}[\bar{\varphi} - B\hat{\theta}^{(i)} + \hat{o}^{(i)}]\hat{\theta}^{(i)T}. \quad (33)$$

As for (31), the ADMoM can be employed to find its optimal solution. To this end, (31) can be re-formulated as:

$$\{\hat{\theta}^{(i)}, \gamma, \xi, \hat{o}^{(i)}\} = \quad (34)$$

$$\arg \min_{\substack{0 \geq 0_{N_b N_g} \\ \gamma, \xi, o}} \left[ \frac{1}{2}\|\bar{\varphi} - (B + \hat{E}^{(i-1)})\theta + o\|_2^2 + \lambda_1\|\xi\|_1 + \lambda_2 \mathcal{R}_G(\gamma) + \lambda_3\|o\|_1 \right] \text{ s.t. } \xi \geq 0_{N_b N_g}, \theta = \gamma, \theta = \xi$$

with $\gamma$ and $\xi$ denoting auxiliary vector variables. Letting again $\eta$ and $\mu$ denote the Lagrange multipliers associated with the constraints $\Theta = \gamma$ and $\Theta = \xi$, respectively, the quadratically augmented Lagrangian function (34) is given by $$\mathcal{L}(\theta, \gamma, \xi, o, \eta, \mu) = \frac{1}{2}\|\bar{\varphi} - (B + \hat{E}^{(i-1)})\theta + o\|_2^2 + \lambda_1\|\xi\|_1 + \lambda_2 \mathcal{R}_G(\gamma) + \quad (35)$$

$$\lambda_3\|o\|_1 + \eta^T(\theta - \gamma) + \mu^T(\theta - \xi) + \frac{c_1}{2}\|\theta - \gamma\|_2^2 + \frac{c_2}{2}\|\theta - \xi\|_2^2.$$

Starting from any initial vectors $o^{(0)}, \gamma^{(0)}, \xi^{(0)}, \eta^{(0)}, \mu^{(0)}$, each iteration j of the ADMoM (within each iteration i of the block coordinate descent) proceeds in these steps:

$$\theta^{(i,j)} = \arg\min_\theta \mathcal{L}(\theta, \gamma^{(j-1)}, \xi^{(j-1)}, o^{(i,j-1)}, \eta^{(j-1)}, \mu^{(j-1)}) \quad (36a)$$

$$\gamma^{(j)} = \arg\min_\gamma \mathcal{L}(\theta^{(i,j)}, \gamma, \xi^{(j-1)}, o^{(i,j-1)}, \eta^{(j-1)}, \mu^{(j-1)}) \quad (36b)$$

$$\xi^{(j)} = \arg\min_{\xi \geq 0} \mathcal{L}(\theta^{(i,j)}, \gamma^{(j)}, \xi, o^{(i,j-1)}, \eta^{(j-1)}, \mu^{(j-1)}) \quad (36c)$$

$$o^{(i,j)} = \arg\min_o \mathcal{L}(\theta^{(i,j)}, \gamma, \xi^{(j-1)}, o, \eta^{(j-1)}, \mu^{(j-1)}) \quad (36d)$$

$$\eta^{(j)} = \eta^{(j-1)} + c_1(\theta^{(j)} - \gamma^{(j)}) \quad (36e)$$

$$\mu^{(j)} = \mu^{(j-1)} + c_2(\theta^{(j)} - \xi^{(j)}). \quad (36f)$$

Since (34) is convex and satisfies the requirements for the ADMoM to be convergent, iterates $\{\Theta^{(i,j)}, o^{(i,j)}\}$ will converge to the solution $\{\hat{\Theta}^{(i)}, \hat{o}^{(i)}\}$ of (31).

Problem (36a) admits the closed-form solution given by $$\theta^{(i,j)} = \left[(B + \hat{E}^{(i-1)})^T(B + \hat{E}^{(i-1)}) + (c_1 + c_2)I_{N_b N_g}\right]^{-1} \times \quad (37)$$

$$\left[(B + \hat{E}^{(i-1)})(\bar{\varphi} + o^{(i,j-1)}) + c_1\gamma^{(j-1)} + c_2\xi^{(j-1)} - \eta^{(j-1)} - \mu^{(j-1)}\right]$$

where $\gamma^{(j)}$ and $\xi^{(j)}$ are still computed via (20) and (22). Using Lemma 2, it is possible to show that the solution of (36d) is computed via soft-thresholding as $$o^{(i,j)} = \mathcal{S}_{\lambda_3}(\bar{\varphi} - (B + \hat{E}^{(i-1)})\theta^{(i,j)}). \quad (38)$$

At each step of the ADMoM algorithm the soft-thresholding in (38) tags as outliers the (current) residuals $\bar{\varphi} - (B + \hat{E}^{(i-1)})\theta^{(i,j)}$ that exceed $\lambda_3$. The overall solver is tabulated as Algorithm 3. With arguments similar to Proposition 2, the following result can be asserted.

Proposition 3. For any initialization $\{\hat{\theta}^{(0)}, \hat{o}^{(0)}, \hat{E}^{(0)}\}$, the iterates $\{\hat{\theta}^{(i)}, \hat{o}^{(i)}, \hat{E}^{(i)}\}$ in (32)-(31) converge monotonically to a stationary point of problem (30).

Figure 4:
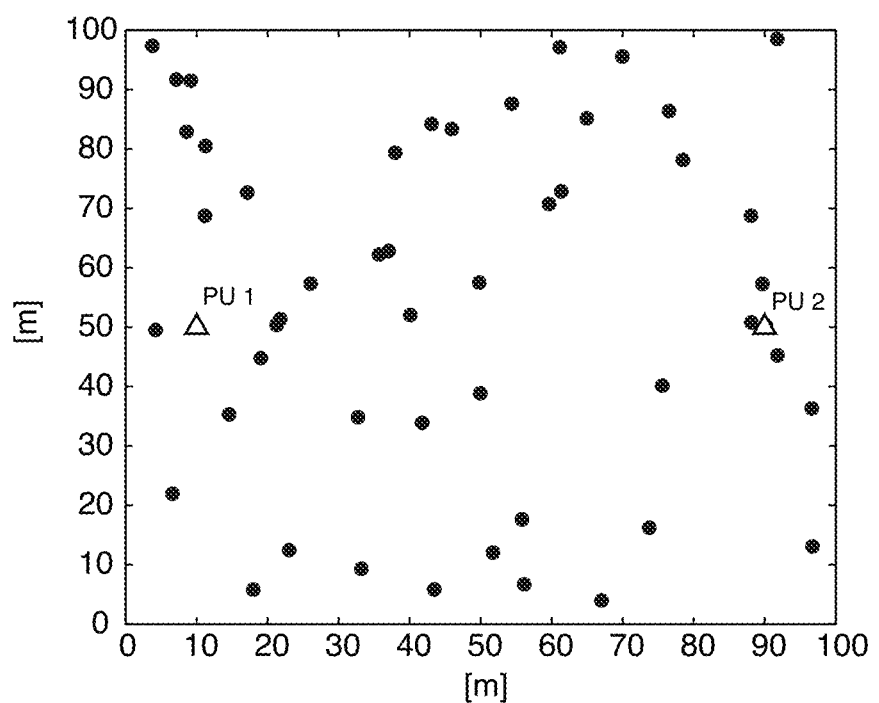
FIG. 4 shows an example CR network topology.

Simulations are now described. Consider a set of $N_r=50$ CRs uniformly distributed in an area of 100 m×100 m, cooperating to localize $N_s=2$ active PUs and estimate their PSD map. CRs and PU sources are marked with blue circles and red triangles, respectively, in FIG. 4. PUs transmit raised cosine pulses with unitary amplitude (0 dB), roll-off factor $\varrho=0.5$, and bandwidth W=10 MHz. They share the band B=[100,200] MHz with spectra centered at frequencies $f_c$=115 and 175 MHz for "PU 1" and "PU 2", respectively. CRs adopt a path loss-only model to accomplish the sensing task.

Transmitted signals are searched over a grid of $N_b$=10 evenly spaced center frequencies $f_c$=95+vW, $v \in \{1, \ldots, 10\}$. Each CR computes periodogram samples at N=64 frequencies at signal-to-noise-ratio (SNR) −5 dB, and averages them across $\tau$=100 time-slots to form $\hat{\Phi}_{x_r}(\tau, f_k)$, k=1, ..., 64, as in (4).

Figure 5A:
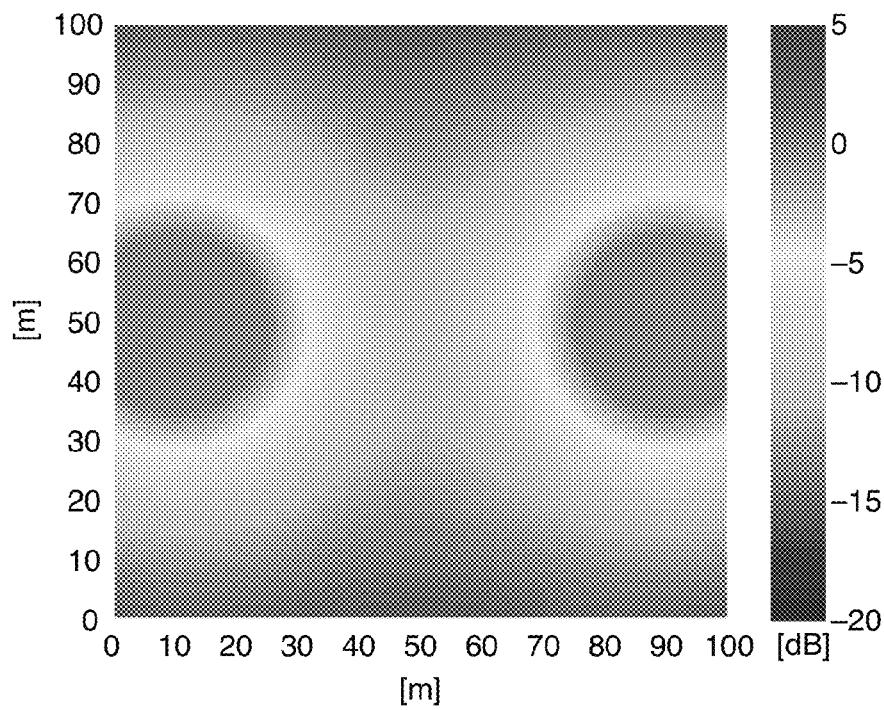
FIGS. 5A, 5B represent PSD maps.
Figure 5B:
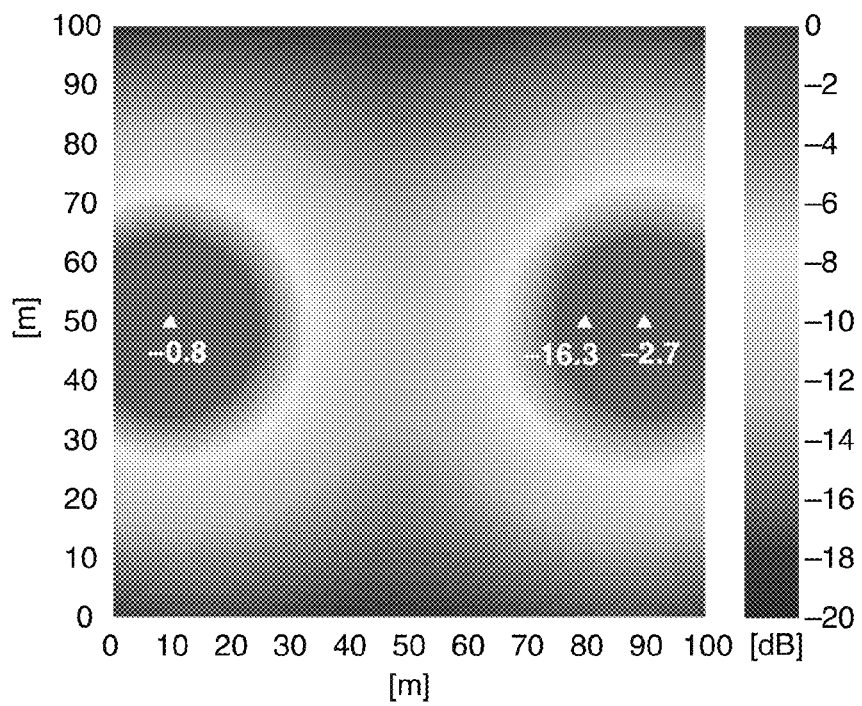
Figure 6:
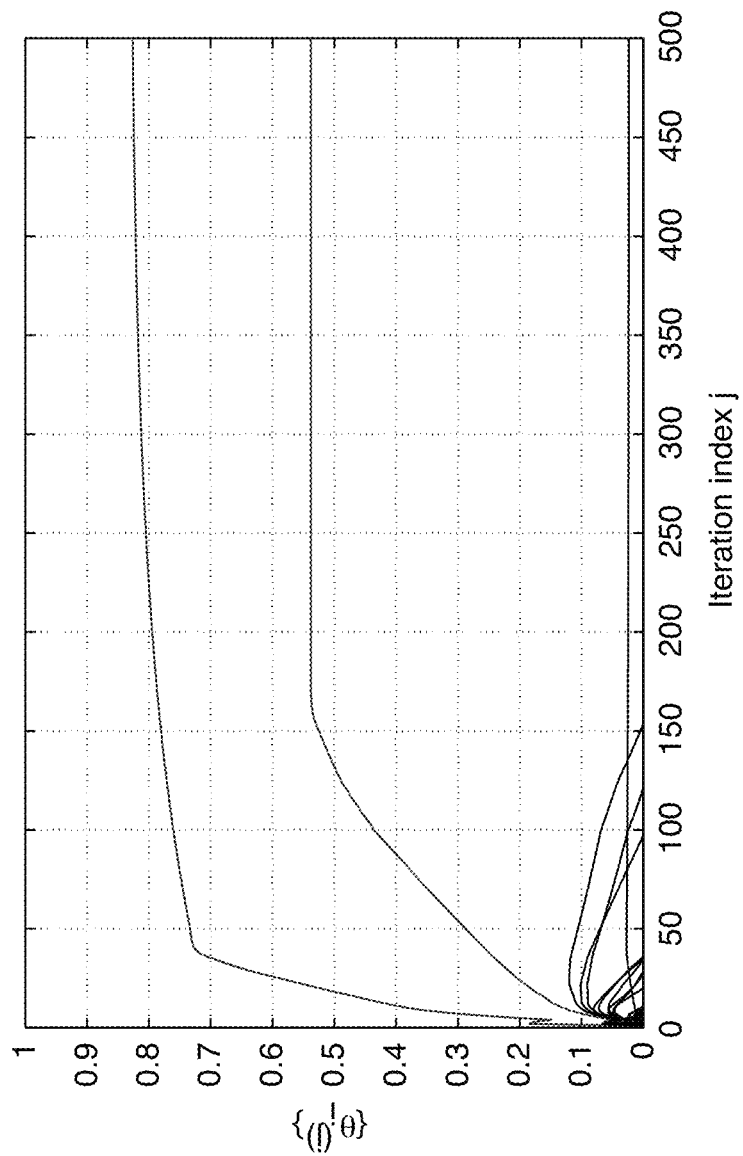
FIG. 6 illustrates evolution of the entries of $\Theta^{(j)}$.

In the first experiment, the PSD generated by PU s experiences only small-scale fading in its propagation from $x_s$ to any location x, where it is measured in the presence of noise with variance $\sigma_v^2$=0.1. To simulate small-scale fading $\{h_{x_s \to x}\}$, a 6-tap Rayleigh model with exponential power delay profile is adopted. Since the expected gain adheres to a path loss propagation law, the regression matrix is in this case perfectly known. FIG. 5A depicts the true PSD map summed across frequencies, which peaks at the active PU locations. To localize and estimate the transmit-PSDs, a grid of $N_g$=100 equidistant points is used. The map obtained by using the GS-Lasso-based sensing algorithm is shown in FIG. 5B, which also depicts the estimated positions of the transmitting PUs along with their transmission powers (in dB) represented by the coefficients of the normalized raised-cosines. One can readily notice that "PU 1" is perfectly localized and its transmit-PSD is estimated accurately. As for "PU 2", its location is revealed although spurious power is also leaked to an adjacent grid point. The sparsity-promoting parameters $\lambda_1$ and $\lambda_2$ are set to $\lambda_1=30 \cdot \max\{B^T \phi\}$ and $\lambda_2=10 \cdot \max_r\{|B_{x_r}^T \phi|_2\}$, respectively. FIG. 6 corroborates the convergence of the GS-Lasso solver by showing the evolution of the elements of $\Theta^{(j)}$.

Figure 7:
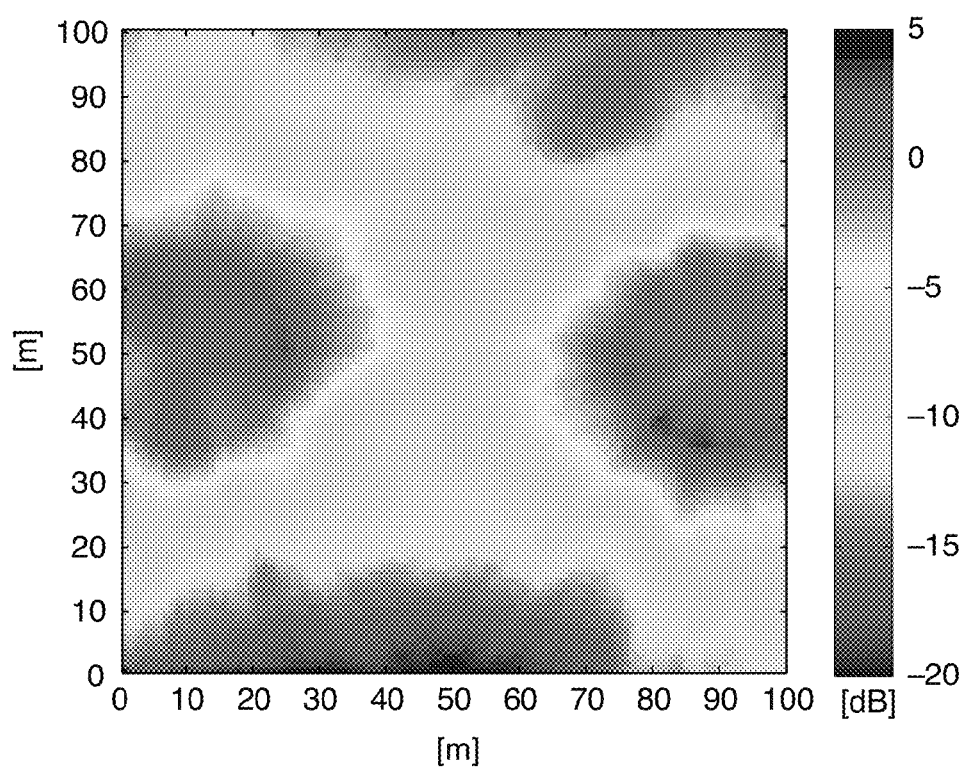
FIG. 7 illustrates a true PSD map with shadowing propagation effects.

In FIG. 7, the transmit-PSDs undergo not only small-scale fading but also log-normal shadowing. As the CRs employ a path loss-based model, shadowing here perturbs the regression matrix. Expressed in logarithmic scale, the shadowing process has zero mean and standard deviation 6 dB. The estimated PSD maps obtained by using the "plain" GS-Lasso and the GS-TLS-based sensing algorithm are compared in FIG. 8.

Figure 8A:
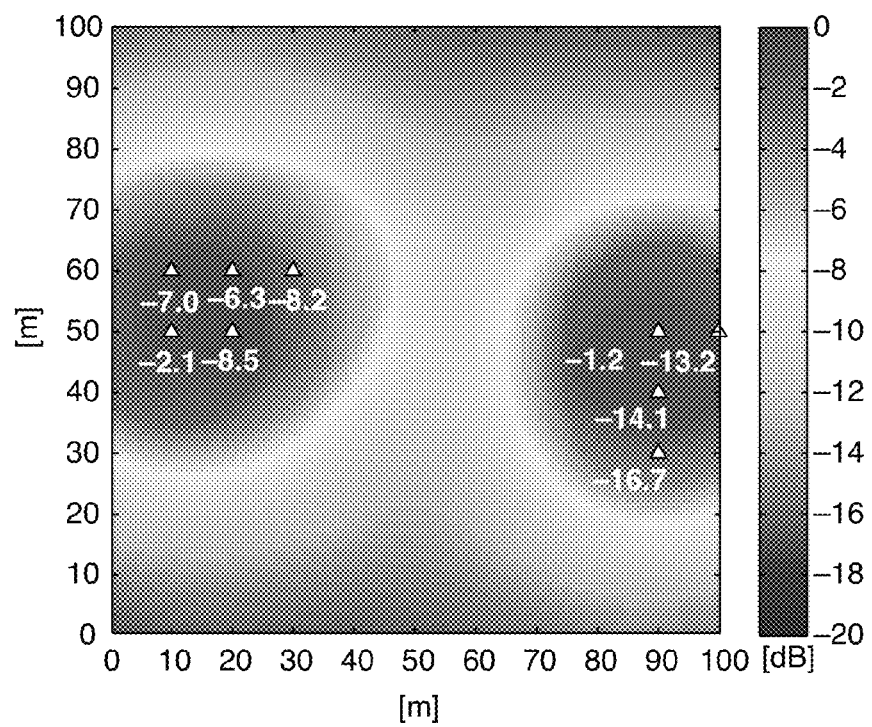
FIGS. 8A, 8B illustrate estimated PSD maps of FIG. 7.
Figure 8B:
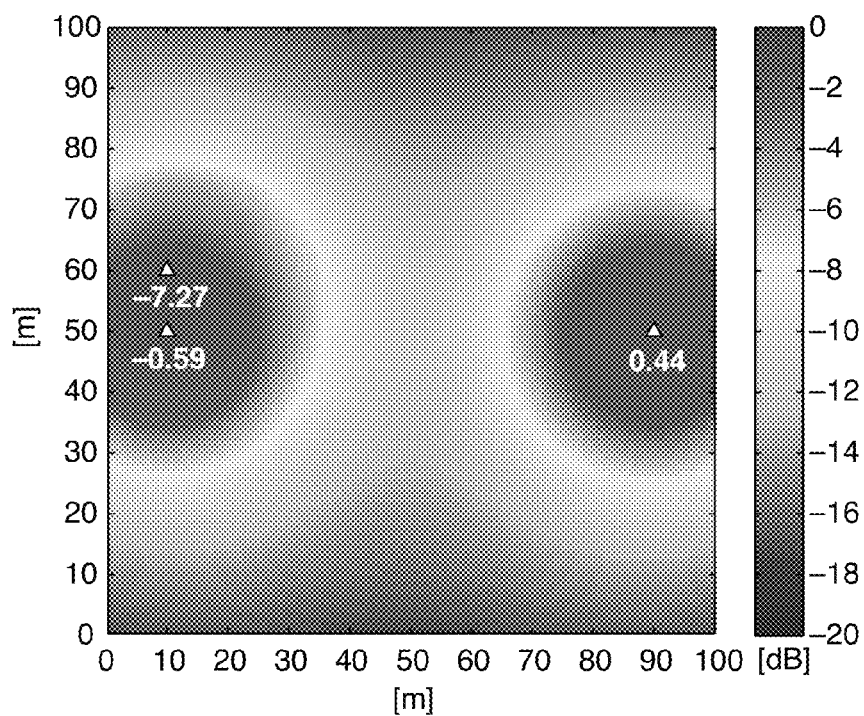

FIG. 8A illustrates that the GS-Lasso is unable to localize the two PUs, as clouds of PU sources are falsely revealed around the actual locations of "PU 1" and "PU 2". Also, it does not accurately estimate their PSDs. On the other hand, the GS-TLS algorithm reveals the exact location of both PUs, although a rather small amount of spurious power is leaked to a grid point close to "PU 1". Note also that the transmit-powers are estimated with considerably higher accuracy. Numerical experiments have shown that only a few (5 to 10) iterations suffice for the alternating descent algorithm to converge.

The enhanced localization and power estimation capabilities impact also the subsequent CR power allocation task, which relies on the estimated coverage region of the PU-transmitters to re-use the licensed bands without causing harmful interference to any potential PU receiver. GS-Lasso will be preferable if a coarse description of the "interference-heavy" areas in terms of PU activity is desired over say accurate localization and transmit-power estimation of the PUs. Such a coarse can be useful for e.g., temporal (rather than spatio-temporal) frequency re-use purposes.

Figure 9:
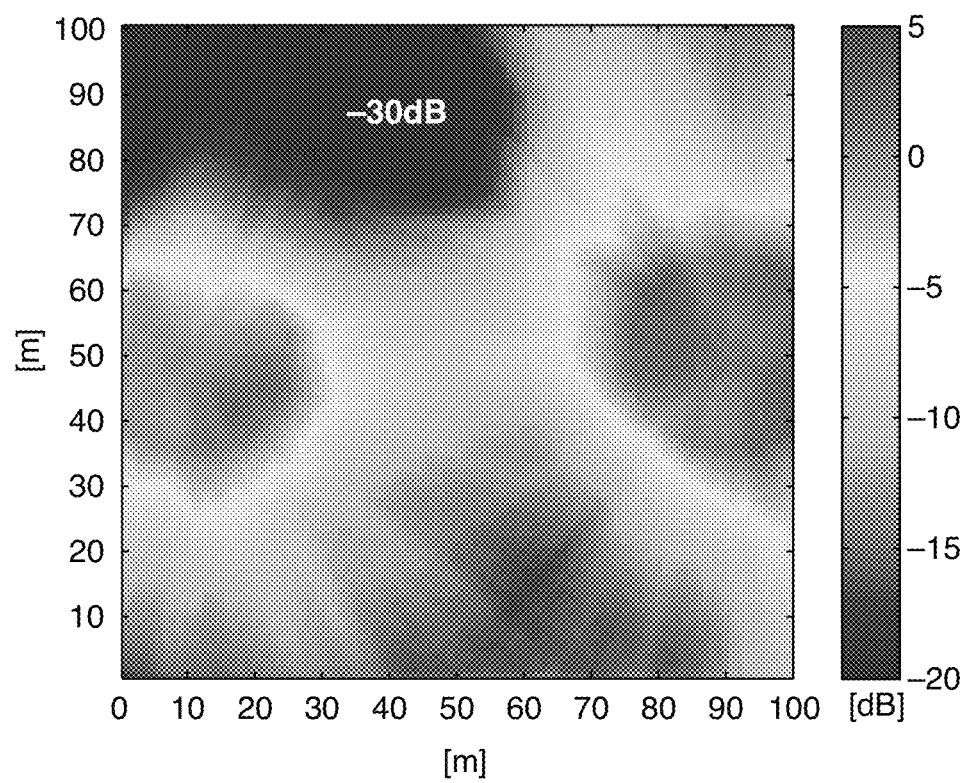
FIG. 9 illustrates a true PSD map with deep shadowing caused by an obstacle.
Figure 10A:
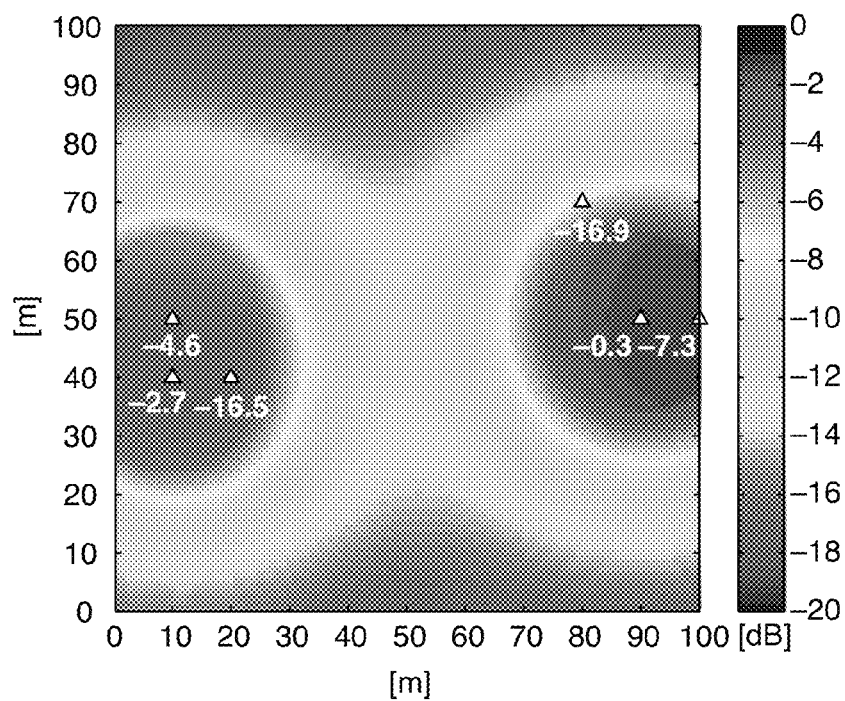
FIGS. 10A, 10B illustrate estimated PSD maps of FIG. 9
Figure 10B:
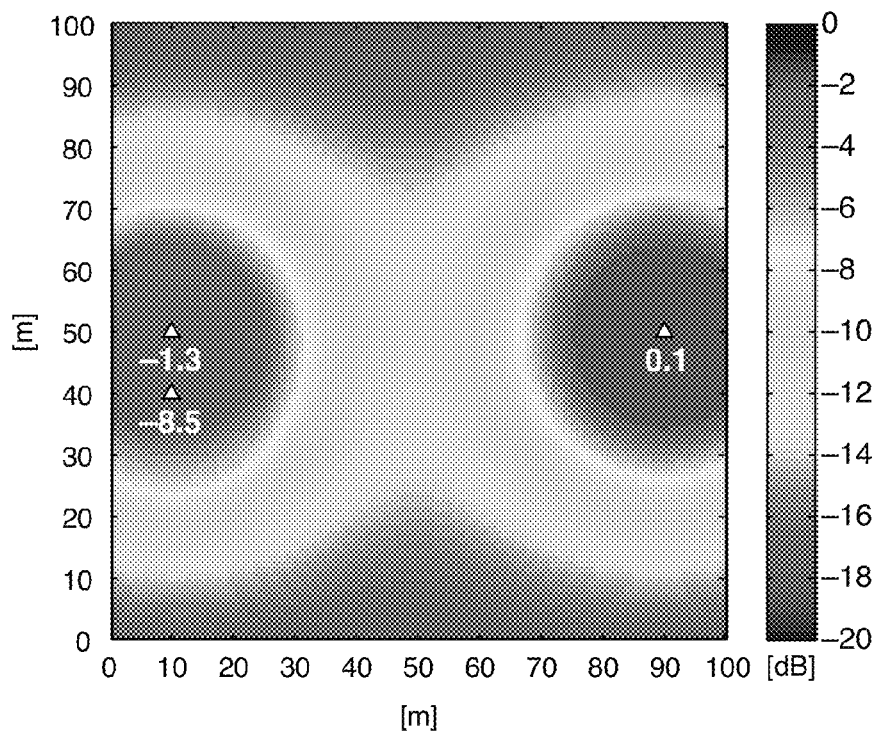

As described, abrupt local shadow fading may severely compromise the PSD estimates at CRs, and thus degrade the sensing performance. This is the case considered in FIG. 9, where an obstacle positioned in the upper-left part of the monitored area causes deep fades of the receive-power at some CRs. FIG. 10A demonstrates that "plain" GS-Lasso fails to localize the two PU transmitters. Activity is revealed around the actual location of "PU 1", and shadowing causes the false detection of a third low-power PU in position $x_g$= (80,70) transmitting over the same band of "PU 2". This false-detection event is not present in FIG. 10B, where the robust GS-TLS algorithm is used. In fact, "PU 2" is well-localized and its transmit-PSD is estimated accurately. A small amount of power is still dribbled on an adjacent grid point of "PU 2". With $\lambda_3 = 30 \cdot \max\{B^{T^*}\phi\}$, further analysis of the data reveals that 15% of the periodogram samples, specifically those collected by the "faded CRs", was declared unreliable, and was thus discarded Cognitive Radio Spectrum Prediction Using Dictionary Learning As described above, the radio frequency (RF) spectrum is a precious resource that must be utilized efficiently. Fixed spectrum allocation, which confers exclusive access rights on spectrum license holders, has resulted in significant under-utilization of the valuable spectral resource, depending on time and locations. The cognitive radio (CR) strategy aims at alleviating this inefficiency by allowing unlicensed secondary users to opportunistically transmit, provided that the transmissions do not disturb the communication of licensed primary users (PUs). To achieve the necessary protection of PU systems, CR systems provide spectrum sensing and intelligent resource allocation. Spectrum sensing is used to identify unused spectral resources in the frequency, time and space domains. The "spectrum holes" can then be exploited through agile resource allocation.

A simplifying assumption often made for spectrum sensing is that the spectrum occupancy is more or less invariant over the deployment region of the CR systems. Based on this, spectrum sensing is often performed in a collaborative fashion, where the band occupancy by a common set of PU transmitters is detected using observations fused from multiple CRs. This mitigates effectively fading and shadowing, which impede reliable detection of PU presence.

However, the assumption might not hold when PU systems employ a small RF footprint for significant spatial reuse, or the CR network grows in size and gets deployed in a broader geographical region. An instrumental concept in this case is the RF cartography, which provides a map of RF power distribution over space and reveals the spatial variation of spectrum occupancy. Such a construct is useful for optimizing CR network operations, not only in the PHY/MAC, but also in higher layers.

Techniques are described herein that allow interference power present at each CR node in the network to be acquired, and also to predict its future levels. Some example techniques may address the challenge that CRs do not have prior information on the number of PU emitters and the corresponding PU-CR channel gains, which may be needed for combining the measurements from different sensors. Moreover, CRs might not be able to report their measurements every time, due to energy-saving sleep modes or congested signaling channels. A network controller operating accordance to the techniques described herein accounts for missing observations by performing appropriate interpolation. The future spectrum state must be inferred based on past measurements. Machine learning and compressive sensing techniques are employed herein to tackle these challenges. A general dictionary learning framework is adapted here to learn the spatial and temporal patterns of the RF power distribution. To aid in spatial interpolation, the topology information of the CR network is exploited in a semi-supervised learning fashion. Batch and online algorithms are developed. The online techniques can track the slow variation of the RF power distribution, and features low computational complexity and lax memory requirement.

Spatio-temporal spectrum prediction algorithms for cognitive radios (CRs) are developed using the framework of dictionary learning and compressive sensing. The interference power levels at each CR node locations are predicted using the measurements from a subset of CR nodes without a priori knowledge on the primary transmitters. A semi-supervised dictionary learning approach for the interpolation of missing observations in space is described. The proposed techniques are also extended for spatio-temporal prediction. Batch and online alternatives are presented, where the online algorithm features low complexity and memory requirements. Numerical tests verify the performance of the proposed novel methods.

Returning to FIG. 1, consider the CR network (system 10) consisting of M nodes (sensors 12), deployed in a geographical area, over which the interference due to the incumbent PU systems vary, albeit smoothly. CRs 12 form a mesh network by identifying their neighbors, and cooperate for spectrum sensing. System 10 acquires the interference level at each CR node location, based on the measurements collected from a subset of the CR nodes per time. The missing measurements may be due to various practical limitations, such as errors and congestion in the control channel, or the fact that radios are in the sleep mode to save battery.

Suppose that there are K PU transmitters (RF-enabled devices 15) in the area with the k-th PU transmitting at power $p_k(t)$. Let $g_{mk}(t)$ denote the channel gain from the k-th PU to the m-th CR. Then, the interference power level $\pi_m(t)$ perceived at the m-th CR can be modeled as $$\pi_m(t) = \sum_{k=1}^{K} g_{mk}(t) Pk(t), m \in \mathcal{M} := \{1, 2, \ldots, M\} \quad (1.1)$$

Upon defining vectors $\pi(t):=[\pi_1(t), \ldots, \pi_M(t)]^\tau$ ($.^\tau$ denotes transposition) and $P(t):=[p_1(t), \ldots, p_k(t)]^\tau$ as well as matrix $G(t)$ whose (m,k)-entry is $g_{mk}(t)$, the matrix-vector counterpart of (1) can be expressed as $$\pi(t) = G(t) P(t). \quad (1.2)$$

At each time t, a subset $M^{obs}(t) \subset$ of CRs observe the interference power levels. The measurements from these CRs can be stacked in vector $y^{obs}(t) \in R^{|M^{obs}(t)|}$ given as $$y^{obs}(t) = 0(t)\pi(t) + z(t) \quad (1.3)$$

where $(t) \in R^{|M^{obs}(t)|}$ is the measurement noise vector, and (t) is a matrix consisting of the m-th row of an M×M identity matrix, where $m \in M^{obs}(t)$.

The problem of estimating G(t) and p(t), given the past and the current measurements $y^{obs}(\tau)$ for $\tau=1, 2, \ldots, t$, when there were no missing observations was tackled using dictionary learning in [13]. Here, the goal is to predict the missing interference levels $\pi_m(t)$ for $\pi_m(t)$ for $m \in M^{miss}(t):=M \setminus M^{obs}(t)$, given $\{y^{obs}(\tau)\}_{\tau=1}^{t}$.

Techniques for spatial spectrum prediction using semi-supervised dictionary learning are described. Prompted by (1.2), suppose that π can be represented as a linear combination of a small number of bases (atoms) taken from a dictionary. Let $\in R^{M \times Q}$ denote a dictionary with Q atoms. Then, the preceding assumption amounts to $$\pi = Ds \quad (1.4)$$

where vector $\in R^Q$ is sparse. Fourier bases or the wavelet bases are some of the dictionaries often used for a variety of natural or man-made signals. Based on this model, the techniques described below leverage compressive sensing and machine learning to predict the unobserved interference levels in space. In the following, a two-stage approach is first considered, in which the dictionary learned in the training phase is used for the desired prediction task in the operational phase. An alternative algorithm capable of performing the dictionary learning and spatial prediction simultaneously will be presented subsequently.

An example two-phase batch implementation is described. Instead of using off-the-shelf bases such as Fourier or the wavelet bases, D can be directly learned from training data, which can be collected through a sounding procedure. In the presence of missing entries in the data, it is helpful to augment this learning process with additional structural information. In this work, the network topology information, which is typically maintained for various network control tasks such as routing, is leveraged in the framework of semi-supervised learning.

Let $A \in \{1, 0\}^{M \times M}$ denote the adjacency matrix of the CR network topology. Thus, the (m,m')-th entry $a_{m,m'}$ of for m,m'$\in$ is 1 if nodes m and m' are neighbors, and 0 otherwise. Then, the Laplacian matrix is defined as :=diag(1)-, where 1 is the all-one vector, and diag(v) is a diagonal matrix with the entries of vector v on its diagonal.

Training Phase:

In the training phase, given a training set $\{y_n^{ovs}\}_{n=1}^{N}$, which may contain missing entries, the goal is to form an estimate $\hat{D}$ of D such that $y_n^{obs} \approx O_n \hat{D} s_n$ for $n = 1, 2, \ldots, N$, where coefficients $s_n$ are sparse, and matrix $O_n$ discards the missing entries. Specifically, the following optimization problem is solved to obtain $\hat{D}$.

$$\hat{D} := \arg\min_{D \in \mathcal{D}, \{s_n\}} \sum_{n=1}^{N} f_n(s_n, D) \quad (1.5)$$

where $$f_n(s, D) := \frac{1}{2}\|y_n^{obs} - O_n Ds\|_2^2 + \lambda_s\|s\|_1 + \frac{1}{2}\lambda_L s^\tau D^\tau LDs \quad (1.6)$$

$$\mathcal{D} := \{[d_1, \ldots, d_Q] \in \mathbb{R}^{M \times Q} : \|d_q\|_2^2 \le 1, q = 1, \ldots Q\} \quad (1.7)$$

Here, the first term in (1.6) promotes fitness of the reconstruction to the training datum in a least-squares (LS) sense, and the $l_1$-norm-based regularization term encourages sparsity in s with $\lambda_s > 0$ playing the role of a tuning parameter. The third term in (1.6) can be re-written as $$s^\tau D^\tau LDs = \sum_{m=1}^{M} \sum_{m'=1}^{M} a_{m,m'}(\pi_m - \pi_{m'})^2 \quad (1.8)$$

indicating that it encourages the interference levels experienced at neighboring nodes to be similar, with $\lambda_L > 0$ being a tuning parameter.

To appreciate the role of this Laplacian matrix-based regularization, suppose that a CR never reports an observation during the entire training period. Then, without the last term, the corresponding row in ^ cannot be estimated, making it impossible to predict the interference level at this CR's location. The presence of the Laplacian term allows one to estimate the missing entry relying on neighbors' measurements.

Operational Phase:

Once $\hat{D}$ has been obtained as in (5), the operational phase predicts the interference levels. First, a sparse coding step is performed at each time t to estimate the sparse coefficient (t) corresponding to the measurement $y^{obs}(t)$; that is, $$\hat{s}(t) := \arg\min_s \frac{1}{2}\|y^{obs}(t) - O(t)\hat{D}s\|_2^2 + \lambda_2\|s\|_1 + \frac{1}{2}\lambda_L s^\tau \hat{D}^\tau LDs \quad (1.9)$$

Then, the desired interference levels in π(t) that include the missing entries can be recovered by $\hat{\pi}(t) := \hat{}(t) := \hat{D}\hat{s}(t)$.

Implementation:

Problem (1.9) is convex and there are various specialized algorithms available for solving the problems of this sort extremely fast. On the other hand, (5) is nonconvex, and it is difficult to obtain globally optimal solutions. However, the problem is convex with respect to and $\{s_n\}$ individually. Thus, to find a locally optimal solution, a block-coordinate descent (BCD) algorithm can be employed until convergence.

Specifically, at the k-th iteration, updates are done as:

$$\{\hat{s}_n^{(k)}\} : \arg\min_{\{s_n\}} \sum_{n=1}^{N} f_n(s_n, \hat{D}^{(k-1)}) \quad (1.10)$$

$$\hat{D}^{(k)} := \arg\min_{D \in \mathcal{D}} \sum_{n=1}^{N} f_n(\hat{s}_n^{(k)}, D) \quad (1.11)$$

where $\hat{D}^{(k)}$ and $\{\hat{s}_n^{(k)}\}$ are the k-th iterates. Note that (1.10) can be solved separately per n=1, 2, . . . , N using the same solver as the one for (1.9). To solve (1.11), a BCD algorithm can be once again employed over the columns of D. Define $\tilde{L}_n := O_n^\tau O_n + \lambda_L L$, and let $s_{n,q}$ denote the q-th entry of vector $s_n$. Then, the overall dictionary training algorithm is presented in Table 1.

TABLE 1

Input: training set $\{y_n^{obs}\}_{n=1}^N$, $\{O_n\}$, initial dictionary $D_0$, $\lambda_s$, L and $\lambda_L$
Output: $\hat{D} := [\hat{d}_1, \hat{d}_2, \ldots, \hat{d}_Q]$ 1: Set $D = D_0$
2: Repeat
   Perform sparse coding with fixed $\hat{D}$.
3: For n = 1, 2, ..., N
4: $\hat{s}_n = \arg\min_s f_n(s, \hat{D})$
5: Next n
   Perform dictionary update with fixed $\{\hat{s}_n\}$
6: Repeat
7: For q = 1, 2, ..., Q
8: $\bar{d}_q = \hat{d}_q + (\Sigma_{n=1}^N \tilde{L}_n s_{n,q}^2)^{-1}$
    $[\Sigma_{n=1}^N s_{n,q}(O_n^T y_n^{obs} - \tilde{L}_n D s_n)]$
9: $\hat{d}_q = \bar{d}_q / \max\{\|\bar{d}_q\|_2, 1\}$
10: Next q
11: Until convergence
12: Until convergence Example online techniques are now described. In order to track time-varying statistics of the interference patterns, an online algorithm can be derived, in which the dictionary training and spatial interference prediction are performed jointly at the same time. Compared to the batch training discussed, the online algorithm can perform the computation recursively, resulting in significant savings in complexity and memory.

Specifically, the following formulation is adopted, which weights recent observations more heavily.

$$\hat{D}(t), \quad (1.12)$$

$$\{\hat{s}(t)\} = \arg\min_{D \in \mathcal{D}, \{s(t)\}} \sum_{\tau=1}^{t} \beta^{t-\tau} \left(\frac{1}{2}\|y^{obs}(\tau) - O(\tau)Ds(\tau)\|_2^2 + \lambda_s\|s(\tau)\|_1 + \frac{1}{2}\lambda_L s^T(\tau)D^T L D s(\tau)\right)$$

where $\beta \in (0,1]$ is a forgetting factor. Instead of solving problem (1.12) in a batch fashion for the entire time horizon $\tau=1, 2, \ldots, t$ whenever a new observation $y^{obs}(t)$ arrives at each time t, an online approach updates only the "current" coefficient vector $\hat{s}(t)$, while the past ones $\hat{s}(t-1), \ldots, \hat{s}(1)$ are held fixed. Nevertheless, it can be shown under mild conditions that $\hat{D}$ so obtained converges as $t \to \infty$ to the same $\hat{D}$ as would be obtained from a batch approach.

Although the dictionary update depends on the entire observation history, a recursive computation can avoid storing the past observations and calculations. For this, it is useful to maintain the following quantities:

$$A(t) := \sum_{\tau=1}^{t} \beta^{t-\tau} \hat{s}(t) \hat{s}^T(\tau) = \beta A(t-1) + \hat{s}(t)\hat{s}^T(t) \quad (1.13)$$

$$A_m(t) := \sum_{\tau=1}^{t} \beta^{t-\tau} \mathbb{1}_{\{m \in \mathcal{M}^{obs}(t)\}} \hat{s}(t)\hat{s}^T(t) \quad (1.14)$$
$$= \beta A_m(t-1) + \mathbb{1}_{\{m \in \mathcal{M}^{obs}(t)\}} \hat{s}(t)\hat{s}^T(t), m \in \mathcal{M}$$

$$B(t) := \sum_{\tau=1}^{t} \beta^{t-\tau} O^T(\tau) y^{obs}(\tau) \hat{s}^T(\tau) \quad (1.15)$$
$$= \beta B(t-1) + O^T(t) y^{obs}(t) \hat{s}^T(t)$$

where $\mathbb{1}_{\{\cdot\}}$ is an indicator function equal to 1 if the condition inside the braces are satisfied, and 0 otherwise.

Similar to the batch case described above, the dictionary update amounts to solving (12) for $\hat{D}(t)$ with $\{\hat{s}(\tau)\}_{\tau=1}^t$ fixed. Let $\hat{s}_j(\tau)$ denote the j-th entry of $\hat{s}(\tau)$, and $A_{m,jq}(t)$ and $A_{jq}(t)$ the (j,q)-th entry of matrices $A_m(t)$ and $A(t)$, respectively. Also, let $b_j(t)$ represent the j-th column of $B(t)$. Then, upon defining $$\Phi_{j,q}(t) := \sum_{\tau=1}^{T} \beta^{t-\tau} \hat{s}_j(\tau) \hat{s}_q(\tau) (O^T(\tau)O(\tau) + \lambda_L L) \quad (1.16)$$

$$= diag([A_{1,jq}(t), A_{2,jq}(t), \ldots, A_{M,jq}(t)]) + \lambda_L A_{jq}(t) L \quad (1.17)$$

the column-wise BCD leads to the following update for the j-th column of $\hat{D}(t)$ $$\bar{d}_j := \Phi_{j,j}(t)^{-1}\left[b_j(t) - \sum_{q=1, q \neq j}^{Q} \Phi_{j,q}(t)\hat{\bar{d}}_q(t)\right] \quad (1.18)$$

$$\hat{d}_j(t) = \frac{\bar{d}_j}{\max\{\|\bar{d}_j\|_2, 1\}}. \quad (1.19)$$

An example method for online spectrum prediction is given in Table II.

TABLE II

Input: online observations $\{y^{obs}(t)\}$, $\{O(t)\}$,
   initial dictionary $D_0$, $\lambda_s$, L, $\lambda_L$ and $\beta \in (0, 1]$
Output: $\{\hat{\pi}(t)\}$
1: Set $D(0) = D_0$, $A(0) = 0$, $A_m(0) = 0 \ \forall m \in \mathcal{M}$, and $B(0) = 0$.
2: for t = 1, 2, ...
   Perform sparse coding
3: $\hat{s}(t) = \arg\min_s \frac{1}{2}\|y^{obs}(t) - O(t)\hat{D}(t-1)s\|_2^2 +$
    $\lambda_s\|s\|_1 + \frac{1}{2}\lambda_{L^T} \hat{D}^T(t-1)L\hat{D}(t-1)s$
   Perform prediction
4: Output $\hat{\pi}(t) = \hat{D}(t-1)\hat{s}(t)$
   Perform dictionary update
5: $A(t) = \beta A(t-1) + \hat{s}(t)\hat{s}^T(t)$
6: $A_m(t) = \beta A_m(t-1) + \mathbb{1}_{\{m \in \mathcal{M}^{obs}(t)\}}\hat{s}(t)\hat{s}^T(t)$
    for $\forall m \in \mathcal{M}$
7: $B(t) = \beta B(t-1) + O^T(t)y^{obs}(t)\hat{s}^T(t)$
8: Set $[\hat{d}_1(t), \ldots, \hat{d}_Q(t)] = \hat{D}(t-1)$
9: Repeat
10: For q = 1, 2, ..., Q
11: Update $\hat{d}_q(t)$ as (18)-(19)
12: Next q
13: Until convergence
14: Set $\hat{D}(t) = [\hat{d}_1(t), \ldots, \hat{d}_Q(t)]$
15: Next t Techniques for spatio-temporal spectrum prediction are now described. The algorithms developed so far provide imputations for missing measurements of spatial interference distributions, given the (incomplete) measurements of the current and the past time instants. However, in order to predict the future interference status, for which not even partial measurements can be available, one has to incorporate temporal correlation structures into the model, or learn such structures from the data. In this disclosure, we leverage the data-driven dictionary learning framework to learn temporal dynamics from the data even in an online fashion.

The observations over T consecutive intervals are concatenated into a super-vector, and apply the algorithms described above. That is, define $$y^{obs}(t):=[y^{obs^\tau}(t), \ldots, y^{obs^\tau}(t-T+1)]^\tau \quad (1.20)$$

$$O(t):=[O^\tau(t), \ldots, O^\tau(t-T+1)]^\tau \quad (1.21)$$

$$L:=I_T \otimes L \quad (1.22)$$

where $\otimes$ denotes the Kronecker product, which are used in place of $y^{obs}(t)$, $O(t)$, and $L$, respectively, in the method of Table II.

To perform prediction for $\pi(t+1)$, after executing line 14 in Table II, compute sparse coefficient $\hat{s}^f(t+1)$ for a fictitious observation $y^{obs,f}(t+1):=[y^{obs^\tau}(t), \ldots, y^{obs^\tau}(t-T+2)]^\tau$, assuming that the entire $y^{obs}(t+1)$ is missing; i.e., $O^f(t+1):=[O^\tau(t), \ldots O^\tau(t-T+2)]^\tau$. Then, $\hat{\pi}(t+1)$ can be obtained as $$\hat{\pi}(t+1)=\hat{D}(t)[1:M,:]\hat{s}^f(t+1) \quad (1.23)$$

where $\hat{D}(t)[1:M,:]$ denotes the first M rows of $\hat{D}(t)$.

Figure 11:
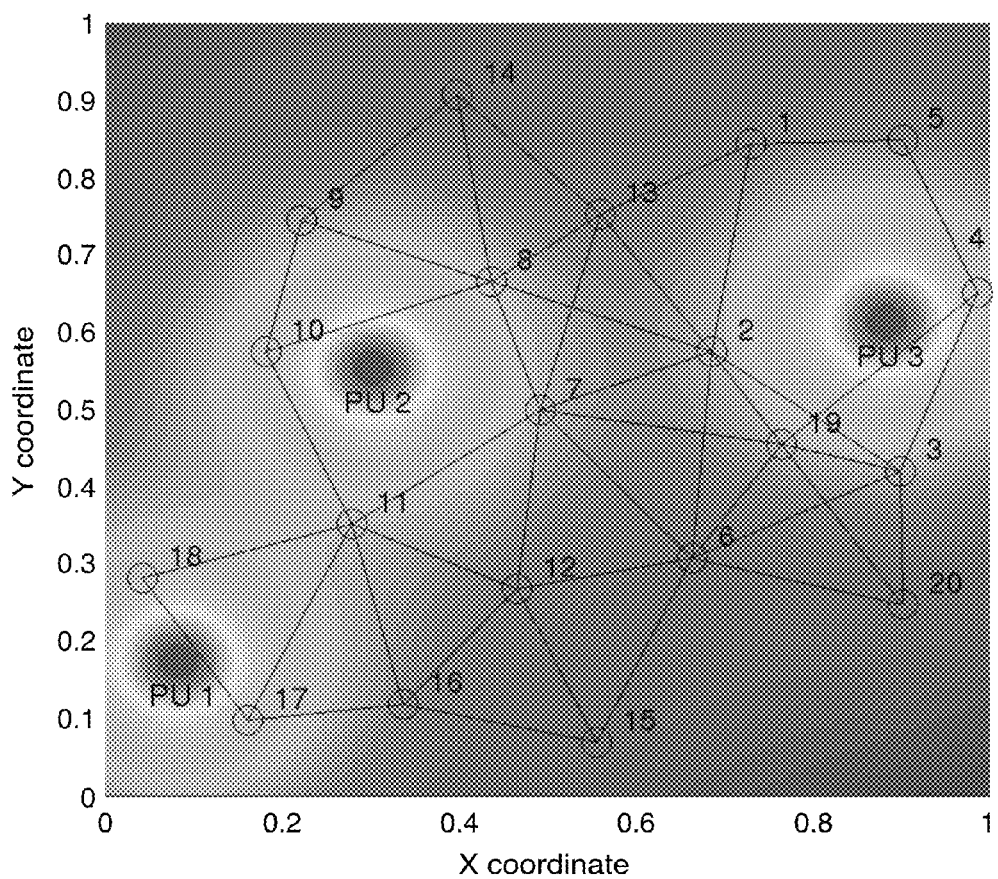
FIG. 11 illustrates an example CR topology and PU transmitter locations for numerical testing of the described techniques.

The performance of the proposed techniques was evaluated via numerical tests. A CR network consisting of M=20 nodes with the topology depicted in FIG. 11 is considered, where the circles denote the CR nodes and the lines represent the connections established among neighbors. The interference power distribution due to K=3 PU transmitters is also depicted in FIG. 1, where the emitter locations are clearly revealed. The pathloss was computed as $$\left(\frac{d}{d_0}\right)^\alpha,$$

where d was the distance, $d_0$=0.01 and $\alpha$=2.5. The number of atoms of the dictionary was set to Q=50.

Figure 12:
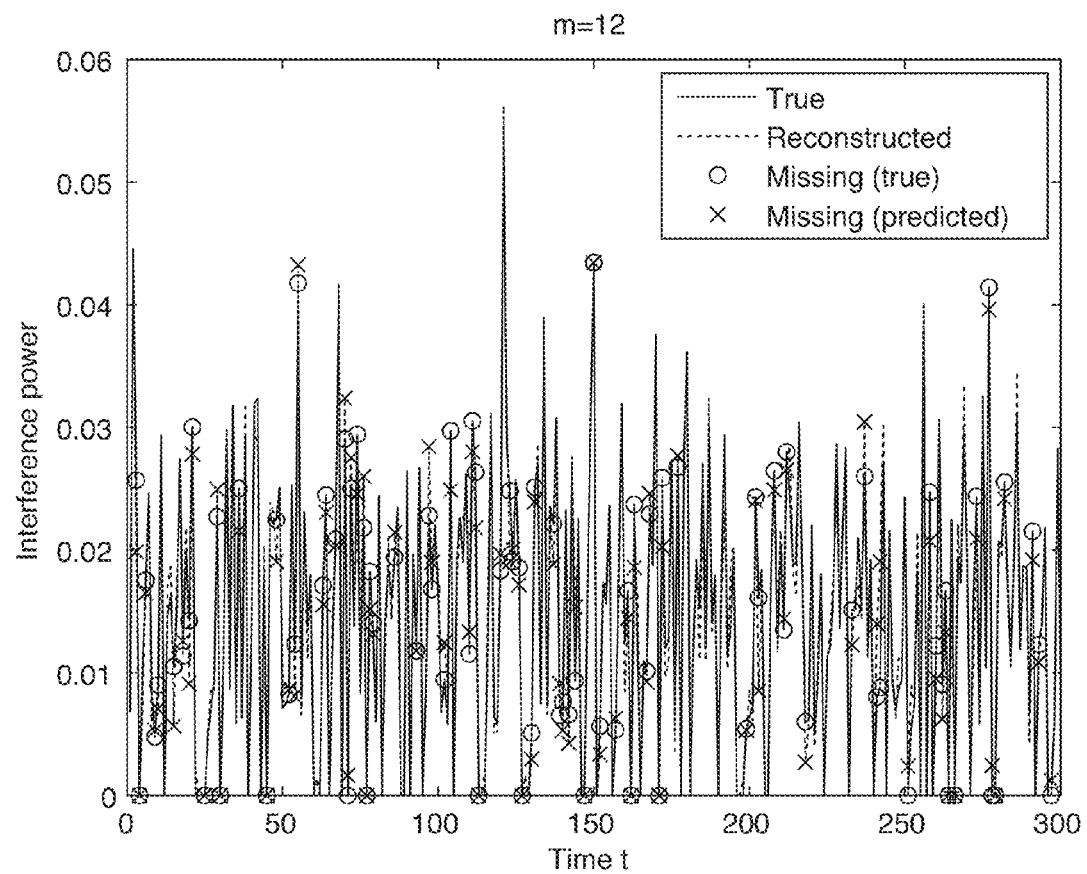
FIG. 12 is a graph illustrating interference power using the batch technique.

First, the two-phase algorithm was tested. Each of the PUs turned on with a 30% chance, and transmitted at a power level $p_k(t)$ chosen from a uniform distribution with support. Each CR made a measurement with a 70% chance. The measurements were corrupted by additive noise generated from a zero-mean Gaussian distribution with variance $10^{-5}$, which was then clipped to ensure non-negativity. The measurements were also normalized by the maximum amplitude observed in the training set. No shadowing or small-scale fading was considered, signifying a quasi-static scenario. N=300 samples were used to train the dictionary, and then another 300 samples were supplied for the operational phase. The values of $\lambda_s$ and $\lambda_L$ were set to 0.1 and 0.005, respectively. To compensate for the bias inherent in Lasso-type estimators, de-biasing was performed in the operational phase; that is, after performing sparse coding in (1.9) to obtain $\hat{s}(t)$, (1.9) was re-solved without the $l_1$ regularization term only for the non-zero entries in $\hat{s}(t)$. FIG. 12 shows the true interference level and the reconstructed one at CR m=12 in the thick blue and the thin red curves, respectively. The missing (true) levels are denoted by the circles, whose interpolations are marked by the crosses. It can be seen that the missing entries are accurately recovered through the proposed method.

Figure 13:
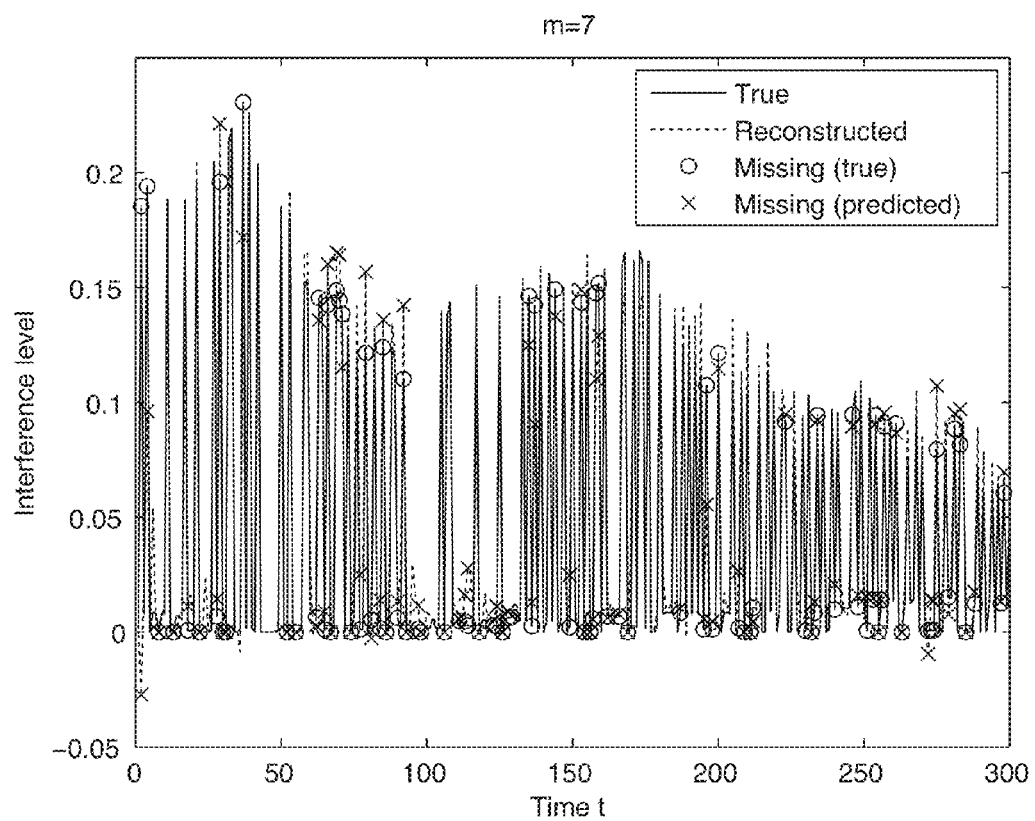
FIG. 13 is a graph illustrating interference power using the online technique.

To test the online algorithm, the Rayleigh fading coefficient $h_{mk}(t)$ for the channel from PU k to CR m at time t was generated using a first-order autoregressive model $$h_{mk}(t)=\alpha h_{mk}(t-1)+\sqrt{1-\alpha^2}w_{mk}(t) \quad (1.24)$$

where $\alpha$=0.9995 was used, and $w_{mk}(t)$ was circularly symmetric zero-mean complex Gaussian noise with variance 1. The overall channel gain $g_{mk}(t)$ was formed by multiplying the pathloss with $|h_{mk}(t)|^2$. The forgetting factor was $\beta$=0.95, and $\lambda_s$=0.25 and $\lambda_L$=0.005 were used. The transmit-power of all PUs was fixed to 150 so that the tracking performance could be clearly visible. FIG. 13 shows the interference level for CR 7, where it is evident that the online algorithm tracks the slow variation of interference levels due to channel fading. Also, it is noted that the initial transient for the online learning is quite short.

Figure 14:
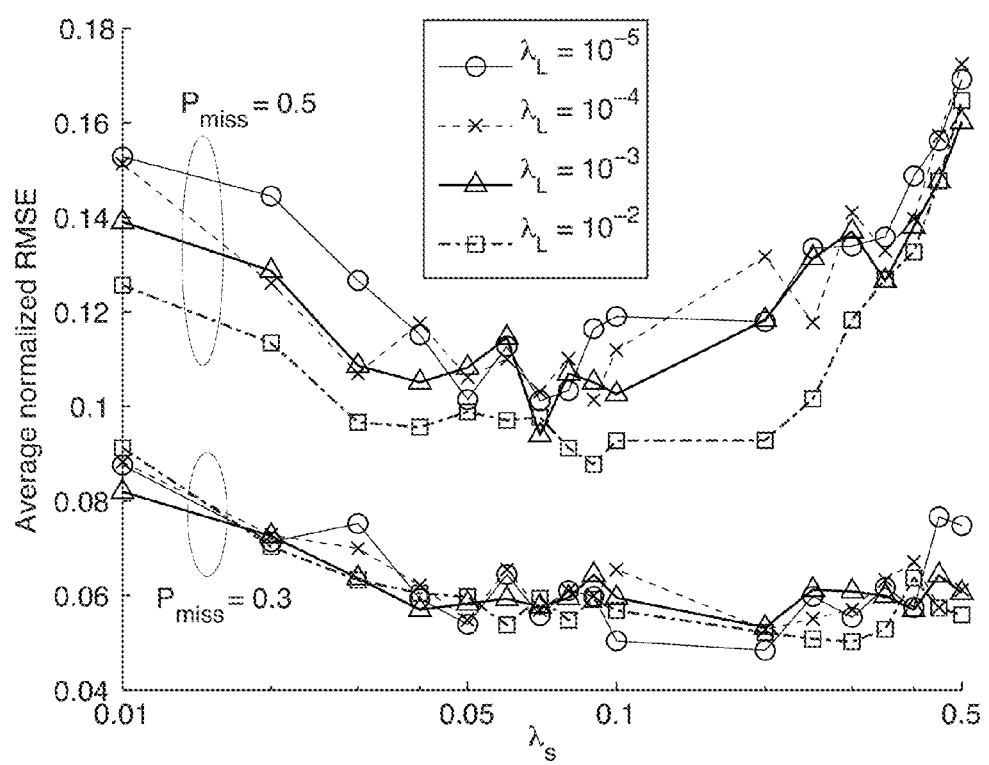
FIG. 14 is a graph illustrating average normalized RMSE.

The normalized root mean square error (RMSE) for the missing observations, averaged over 20 CRs, is depicted in FIG. 14 for various values of $\lambda_s$ and $\lambda_L$. The online algorithm was again used. Two sets of curves are presented, corresponding to the chance of missing observations $P_{miss}$ equal to 0.3 and 0.5. It can be deduced that the Laplacian-based regularization becomes more important when a larger fraction of observations are unavailable.

Figure 15:
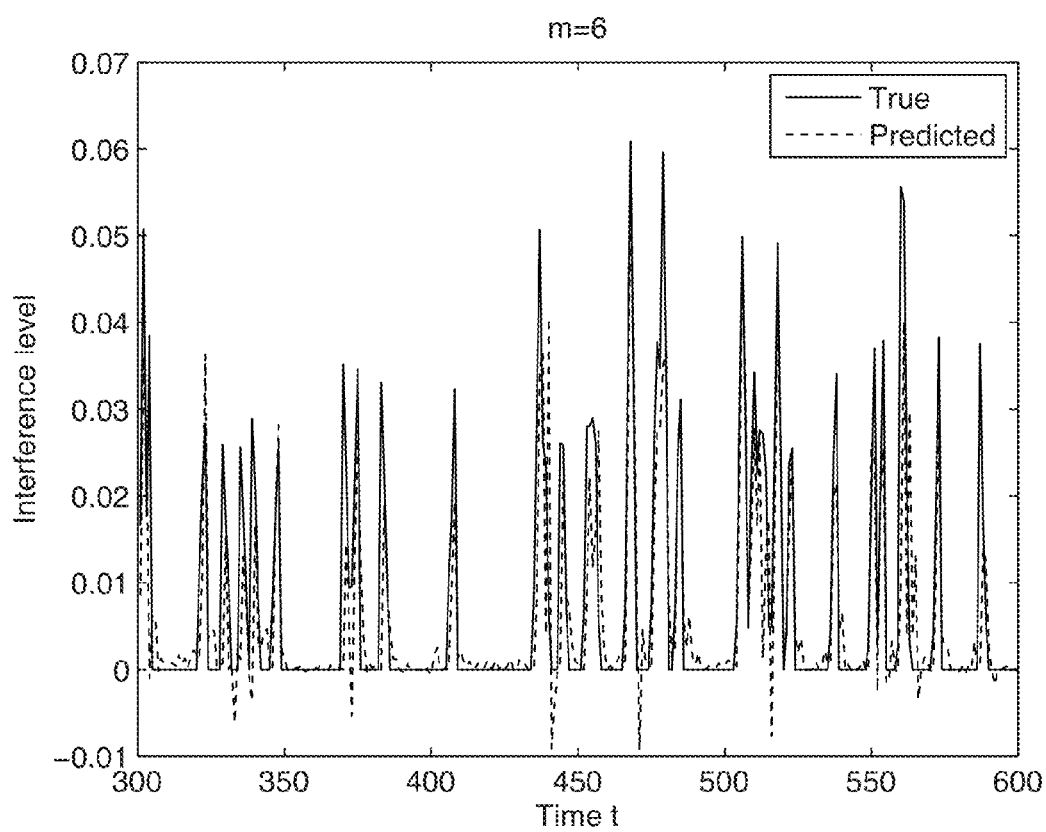
FIG. 15 is a graph illustrating one-time slot prediction.

In order to test the temporal prediction, certain traffic patterns were assumed. That is, at each time interval t, PU 1 tossed a coin and transmitted with probability 0.1. If PU 1 did transmit, PU 2 transmitted in the next time slot, followed by PU 3's transmission in the third time slot. Likewise, at each time t, PU 3 started transmission with probability 0.15, followed by PU 2 in the second time slot, and PU 1 in the third. FIG. 15 shows the result of the one-time slot-ahead prediction of the interference power at CR 6 using the online algorithm with T=4. No missing measurements were assumed. It can be seen that the traffic patterns are successfully acquired by dictionary learning to predict future interference levels.

Spectrum prediction algorithms for CR networks have been described. Using a dictionary learning framework, the techniques can predict the interference power experienced at each CR node based on the current and the past measurements collected from a subset of nodes in the network. Exploiting the fact that the spatial variation of interference is smooth, a regularization term based on the CR network topology was also incorporated. Batch and online algorithms were derived, where the online alternative possessed a tracking capability at lower complexity and memory requirements. Temporal prediction was also discussed. Numerical tests verified the efficacy of the techniques.

Figure 16:
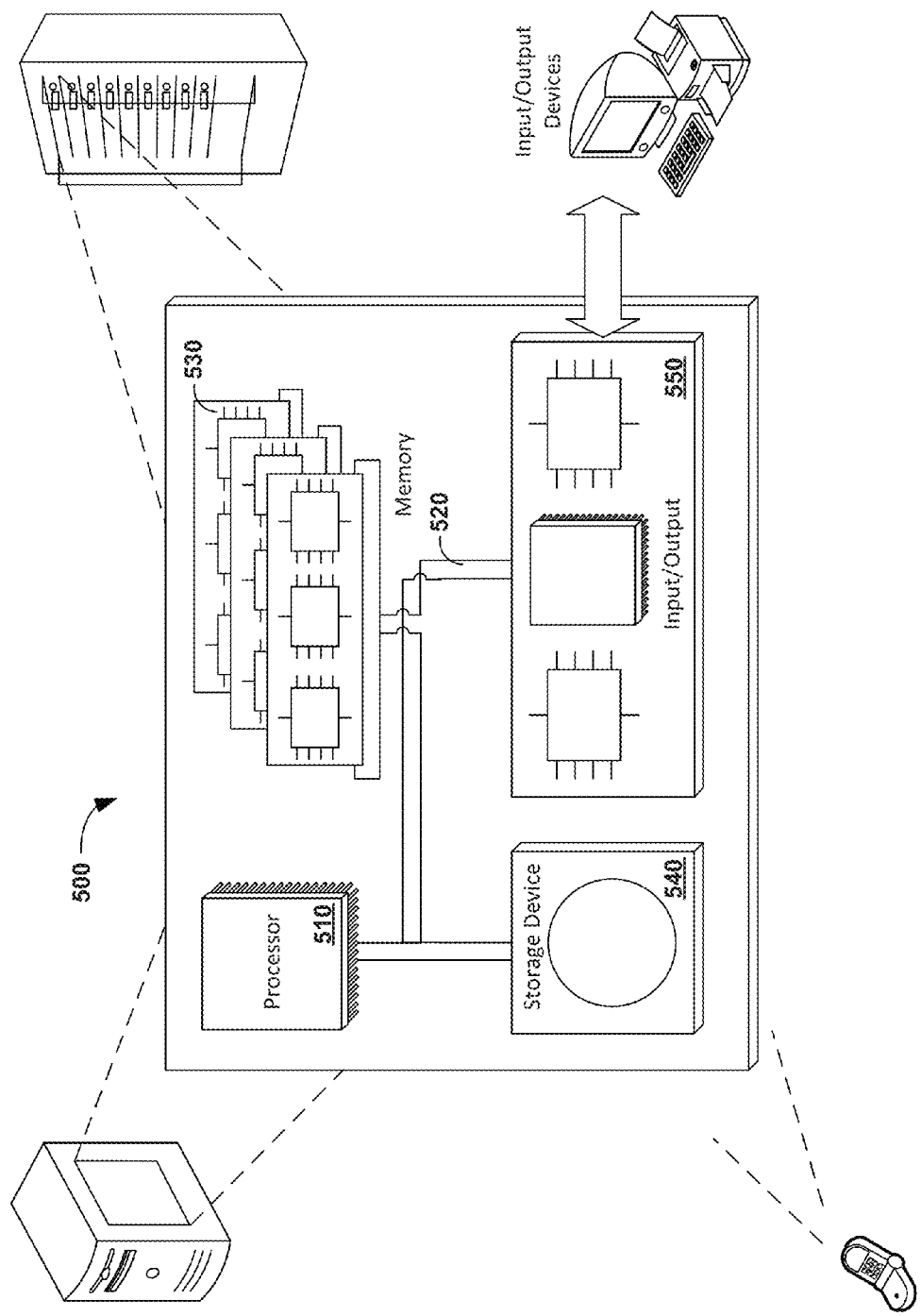
FIG. 16 shows a detailed example of various devices that may be configured to execute program code to practice some embodiments in accordance with the current disclosure.

FIG. 16 shows a detailed example of various devices that may be configured to execute program code to practice some embodiments in accordance with the current disclosure. For example, device 500 may be a CR 12, a FC 16, a workstation, a computing center, a cluster of servers or other example embodiments of a computing environment, centrally located or distributed, capable of executing the techniques described herein.

In this example, a computer 500 includes a processor 510 that is operable to execute program instructions or software, causing the computer to perform various methods or tasks. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server as shown in FIG. 16, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

As described herein, spatio-temporal and dynamic re-use of the licensed bands calls for collaborative CR network sensing algorithms able to portray the ambient power spectral density at arbitrary locations in space, frequency, and time. The present paper addressed this ambitious task through a parsimonious model of the PSD in frequency and space, which reduces the sensing task to estimating a sparse vector of unknown parameters. An estimator of the model parameters was developed based on the GS-Lasso, and a low-complexity solver based on the ADMoM was presented. The location and transmit-PSD information conveyed by the estimated model parameters, complemented with either a path loss-based or more elaborated propagation models was shown to allow CRs to accurately reconstruct the PSD atlas of the primary system. To cope with uncertainty in the regression matrix, a provably convergent sensing algorithm was introduced which combines the merits of the TLS framework with the hierarchical sparsity inherent to the network-level sensing problem. To account for outliers, a robust algorithm able to discern and reject unreliable PSD data was also developed. The novel robust GS-TLS approach capitalizes on the sparsity of the unknown parameters and the outliers, and offers systematic estimation of the spectrum holes jointly in space, frequency, and time while taking into account channel uncertainties and unmodeled errors.

Further exemplary details are described in: Dall'Anese, "Group sparse Lasso for cognitive network sensing robust to model uncertainties and outliers," Physical Communication, November, 2011; Dall'Anese, "Group sparse Lasso for cognitive network sensing robust to model uncertainties and outliers," IEEE $12^{th}$ International Workshop on Signal Processing Advances in Wireless Communications, Jun. 26, 2011; Dall'Anese, "Distributed Cognitive Spectrum Sensing via Group Sparse Total Least-Squares," $4^{th}$ IEEE International Workshop on Computational Advances in Multi-sensor Adaptive Processing," Dec. 13, 2011; and Kim, "Joint Link Learning and Cognitive Radio Sensing," in Proc. of the 45th Asilomar Conf. on Signals, Systems, and Computers, Pacific Grove, Calif., Nov. 6-9, 2011, contents of all of which are incorporated herein by reference.

The following clauses illustrate additional examples:

Clause 1. A method comprising: sensing local radio-frequency (RF) interference spectrum at each of a plurality of sensors positioned at a plurality of locations within a geographic region; and computing a basis expansion model from the sensed RF interference spectrum at each of the sensors to construct a power spectral density (PSD) map representative of the distribution of RF power throughout the geographic region as a function of frequency and location, wherein the basis expansion model is computed as a plurality of functions having a corresponding coefficient, each of the functions representing a power emitted by an RF-enabled device on a corresponding frequency band, and wherein computing the basis expansion model comprises applying group sparse (GS) total least-squares (TLS) method to compute the coefficients.

Clause 2. The method of clause 1, wherein computing estimates for coefficients of the basis expansion model comprises applying an alternating direction method of multipliers (ADMoM) to compute the coefficients.

Clause 3. The method of clause 1, wherein computing a basis expansion model comprises computing the coefficients of the basis expansion model using a group sparse least-absolute-shrinkage-and-selection operator (GS-Lasso).

Clause 4. A system comprising: a plurality of sensors to sense a local radio-frequency (RF) interference spectrum at each of a plurality of locations within a geographic region; and a processor that computes a basis expansion model from the sensed RF interference spectrum at each of the sensors to construct a power spectral density (PSD) map representative of the distribution of RF power throughout the geographic region as a function of frequency and location, wherein the processor computes the basis expansion model is computed as a plurality of functions having a corresponding coefficient, each of the functions representing a power emitted by an RF-enabled device on a corresponding frequency band, and wherein the processor applies group sparse (GS) total least-squares (TLS) method to compute the coefficients.

Clause 5. The system of clause 4, wherein the processor applies an alternating direction method of multipliers (AD-MoM) to compute the coefficients.

Clause 6. The system of claim 4, wherein the processor computes the coefficients of the basis expansion model using a group sparse least-absolute-shrinkage-and-selection operator (GS-Lasso) to identify the coefficients for computation.

Clause 7. A method comprising: sensing, over a period of time, local radio-frequency (RF) interference spectrum at a subset of a plurality of sensors positioned at a plurality of locations within a geographic region; and applying dictionary learning to compute predicted interference power levels at the plurality of sensors for a current time based on current and past measurements collected from the subset of sensor in the network.

Clause 8. The method of clause 7, further comprising constructing a power spectral density (PSD) map representative of the distribution of RF power throughout the geographic region as a function of frequency and location based on the predicted interference power at each of the sensors.

Various embodiments of the invention have been described. These and other embodiments are within the scope of the following claims.

What is claimed is:

1. A method comprising:
   sensing local radio-frequency (RF) interference spectrum at each of a plurality of sensors positioned at a plurality of locations within a geographic region;
   computing a basis expansion model from the sensed RF interference spectrum, wherein the basis expansion model comprises a set of reference basis functions that represent a distribution of RF power emitted by RF-enabled devices throughout the geographic region as a function of frequency and location;
   computing coefficients for the reference basis functions of the basis expansion model using a group sparse least-absolute-shrinkage-and-selection operator (GS-Lasso); and
   constructing, in accordance with the basis expansion model, a power spectral density (PSD) map representative of the distribution of RF power throughout the geographic region.

2. The method of claim 1, wherein computing the coefficients for the reference basis functions of the basis expansion model using a GS-Lasso comprises applying a GS-Lasso operator to select which coefficients of the basis expansion model are required for computation.

3. The method of claim 1, wherein computing the coefficients for the reference basis functions of the basis expansion model using a GS-Lasso comprises applying an alternating direction method of multipliers (ADMoM) to compute the coefficients.

4. The method of claim 1, wherein computing the coefficients for the reference basis functions of the basis expansion model using a GS-Lasso comprises applying a group sparse (GS) total least-squares (TLS) method to identify and remove outlier measurements from the sensed interference spectrum when computing the coefficients.

5. The method of claim 1, wherein computing the basis expansion model comprises computing the basis expansion model as a parametric model in which each of the coefficients for the reference basis functions is a scalar.

6. The method of claim 1, further comprising computing the reference basis functions to represent the aggregate distribution of RF power across the geographic region corresponding to frequencies spanned by the reference basis functions.

7. The method of claim 1, wherein computing the basis expansion model comprises computing a parsimonious model that accounts for scarce presence of transmitting RF-enabled devices by using only a small subset of the coefficients for the model as non-zero as identified by the GS-Lasso.

8. The method of claim 1, wherein computing the basis expansion model comprises performing a most parsimonious sparse signal expansion using an overcomplete basis to construct the PSD maps.

9. The method of claim 1, further comprising:
   communicating observation data indicative of the sensed RF interference spectrum from each of the sensors to a centralized computer; and
   computing the PSD map with the centralized computer based on the observation data.

10. The method of claim 1, further comprising:
    exchanging, between the sensors, observation data indicative of the sensed RF interference spectrum; and
    computing the PSD map with the sensors based on the observation data.

11. The method of claim 1, further comprising:
    processing the PSD map to identify a location within the geographic region where at least one frequency is unoccupied.

12. The method of claim 1, wherein computing the coefficients for the reference basis functions of the basis expansion model using a GS-Lasso comprises:
    applying GS-Lasso to individual coefficients within the model to enforce sparsity in the frequency domain for individual ones of the RF-enabled devices, and
    applying GS-Lasso to groups of coefficients in the model to enforce geographic sparsity in the spatial distribution of the RF-enabled devices.

13. The method of claim 12, wherein computing the coefficients for the reference basis functions of the basis expansion model using a GS-Lasso comprises specifying a first sparsity-promoting parameter $\lambda_1$ to enforce sparsity of individual coefficients in the model and specifying a second sparsity-promoting parameter $\lambda_2$ to enforce sparsity for groups of coefficients in the model.

14. A system comprising:
    a plurality of sensors to sense a local radio-frequency (RF) interference spectrum at each of a plurality of locations within a geographic region; and
    a processor that computes a basis expansion model from the sensed RF interference spectrum at each of the sensors to construct a power spectral density (PSD) map representative of the distribution of RF power throughout the geographic region as a function of frequency and location,
    wherein the processor computes the basis expansion model as a plurality of reference basis functions each having a corresponding coefficient, the reference basis functions representing a power emitted by an RF-enabled device on a corresponding frequency band, and
    wherein the processor computes the coefficients of the basis expansion model using a group sparse least-absolute-shrinkage-and-selection operator (GS-Lasso).

15. The system of claim 14, wherein the processor applies an alternating direction method of multipliers (ADMoM) to compute the coefficients.

16. The system of claim 14, wherein the processor applies a group sparse (GS) total least-squares (TLS) method to identify and remove outlier measurements from the sensed interference spectrum when computing the coefficients.

17. The system of claim 14, wherein the processor computes the reference basis functions to represent RF signals transmitted by RF-enabled devices within the geographic region.

18. The system of claim 14, wherein the processor computes the basis expansion model as a parametric model in which each of the coefficients for the reference basis functions are scalars.

19. The system of claim 14, wherein the processor computes the reference basis functions to represent the aggregate distribution of RF power across the geographic region corresponding to frequencies spanned by the basis functions.

20. The system of claim 14, wherein the processor computes the basis expansion model by computing a parsimonious model that accounts for scarce presence of transmitting RF-enabled devices by using only a small subset of the coefficients for the model as non-zero.

21. The system of claim 14, wherein the processor computes the basis expansion model by performing a most parsimonious sparse signal expansion using an overcomplete basis to construct the PSD maps.

22. The system of claim 14, wherein the processor receives observation data indicative of the sensed RF interference spectrum from each of the sensors, and computes the PSD map with the processor based on the observation data.

23. The system of claim 14,
wherein the sensors exchange observation data indicative of the sensed RF interference spectrum, and
wherein the processor comprises one of a plurality of processors located at the sensors to compute the basis expansion model and construct the PSD map based on the observation data.

24. A mobile device comprising:
a sensor to sense a local radio-frequency (RF) interference spectrum at a locations within a geographic region; and
a processor that computes a basis expansion model from the sensed RF interference spectrum at each of the sensors to construct a power spectral density (PSD) map representative of the distribution of RF power throughout the geographic region as a function of frequency and location,
wherein the processor computes the basis expansion model to include a plurality of functions having a corresponding coefficient, each of the functions representing a power emitted by an RF-enabled device on a corresponding frequency band, and
wherein the processor applies a group sparse least-absolute-shrinkage-and-selection operator (GS-Lasso) to coefficients of the basis expansion model only for frequencies an locations within the geographic region having an active transmitter.

* * * * *